United States Patent
Tong

(10) Patent No.: US 9,661,669 B2
(45) Date of Patent: May 23, 2017

(54) MOBILE COMMUNICATION SYSTEM, BASE STATION, PROCESSOR, AND USER TERMINAL

(71) Applicant: KYOCERA CORPORATION, Kyoto (JP)

(72) Inventor: Fangwei Tong, Machida (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/439,431

(22) PCT Filed: Nov. 5, 2013

(86) PCT No.: PCT/JP2013/079926
§ 371 (c)(1),
(2) Date: Apr. 29, 2015

(87) PCT Pub. No.: WO2014/073539
PCT Pub. Date: May 15, 2014

(65) Prior Publication Data
US 2015/0289305 A1    Oct. 8, 2015

Related U.S. Application Data

(60) Provisional application No. 61/723,415, filed on Nov. 7, 2012.

(51) Int. Cl.
*H04W 76/02* (2009.01)
*H04W 8/00* (2009.01)
*H04L 12/26* (2006.01)
*H04W 24/08* (2009.01)

(52) U.S. Cl.
CPC ....... *H04W 76/023* (2013.01); *H04L 43/0829* (2013.01); *H04L 43/0852* (2013.01); *H04W 8/005* (2013.01); *H04W 24/08* (2013.01)

(58) Field of Classification Search
CPC .................................................. H04W 76/023
See application file for complete search history.

(56) References Cited

U.S. PATENT DOCUMENTS

2008/0032706 A1    2/2008  Sheynblat et al.
2011/0258313 A1   10/2011  Mallik et al.
(Continued)

FOREIGN PATENT DOCUMENTS

JP    2011-166674 A    8/2011
JP    2011-215019 A   10/2011
(Continued)

OTHER PUBLICATIONS

International Search Report; PCT/JP2013/079926; Dec. 10, 2013.
(Continued)

*Primary Examiner* — Huy D Vu
*Assistant Examiner* — Teisha D Hall
(74) *Attorney, Agent, or Firm* — Studebaker & Brackett PC

(57) ABSTRACT

A mobile communication system comprises: a base station, a first user terminal that establishes a connection with the base station, and a second user terminal that performs communication with the first user terminal via the base station, the mobile communication system supporting D2D communication that is direct device to device communication, wherein when it is determined that the D2D communication by the first user terminal and the second user terminal is possible, the base station transmits, to the first user terminal, an instruction for having a signal for discovery transmitted, the signal for discovery being used in discovery of a communication partner terminal in the D2D communication.

13 Claims, 15 Drawing Sheets

(56) References Cited

U.S. PATENT DOCUMENTS

| | | | |
|---|---|---|---|
| 2012/0011247 A1 | 1/2012 | Mallik et al. | |
| 2014/0036793 A1* | 2/2014 | Johnsson | H04W 24/04 370/329 |
| 2014/0056220 A1* | 2/2014 | Poitau | H04W 40/246 370/328 |
| 2015/0281937 A1* | 10/2015 | Li | H04W 8/005 370/329 |

FOREIGN PATENT DOCUMENTS

| | | |
|---|---|---|
| WO | 2008/016901 A2 | 2/2008 |
| WO | 2011/130623 A2 | 10/2011 |
| WO | 2012/006446 A1 | 1/2012 |

OTHER PUBLICATIONS

3GPP TR 22.803 V0.3.0 (May 2012); 3rd Generation Partnership Project; Technical Specification Group SA; Feasibility Study for Proximity Services (ProSe)(Release 12).

An Office Action; "Notice of Reasons for Rejection," issued by the Japanese Patent Office on Jun. 14, 2016, which corresponds to Japanese Patent Application No. 2014-545714 and is related to U.S. Appl. No. 14/439,431; with English language statement of relevance.

SA1; "Reply LS on organization of the work on public safety"; 3GPP TSG-RAN #57; RP-120923; Sep. 4-7, 2012; pp. 8-10, 16-18, 22-23; Chicago, USA.

* cited by examiner

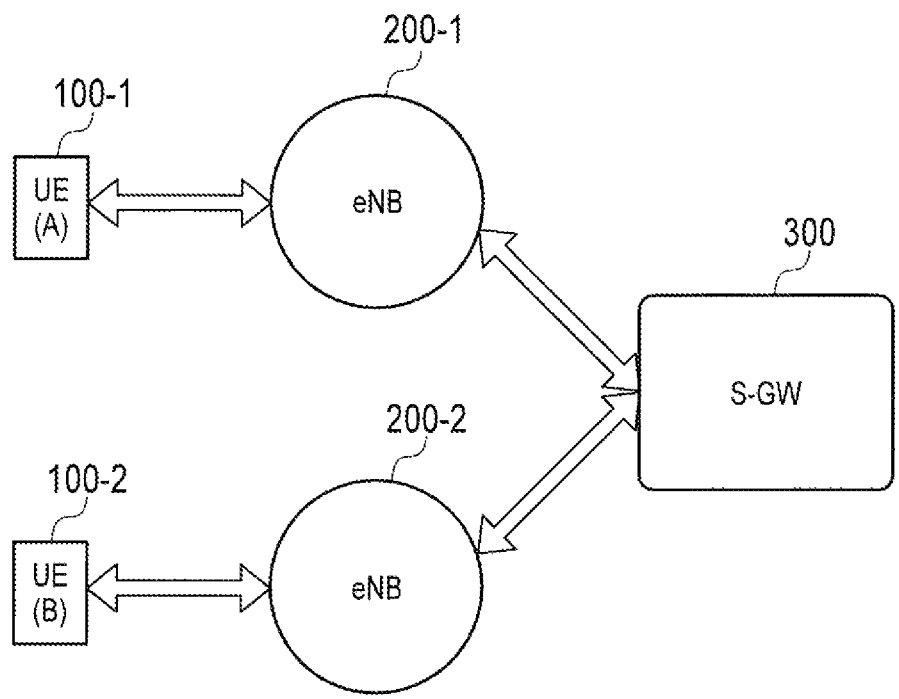
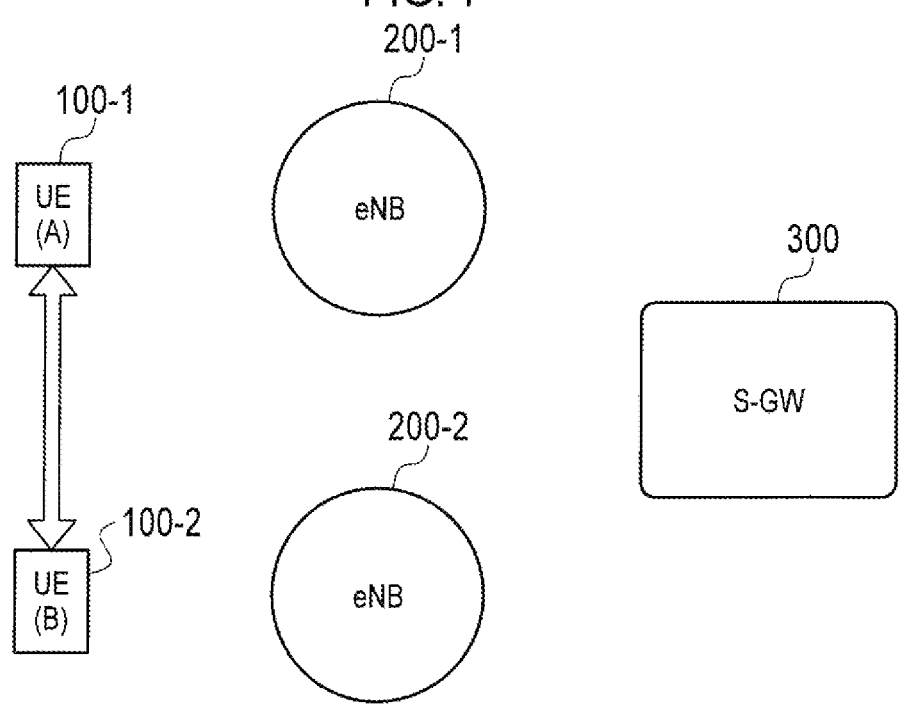

|  | 1 | 2 |
|---|---|---|
| UE THAT IS ESTABLISHING CONNECTION WITH eNB 200 | UE100-1 | UE100-2 |
| UE SERVING AS COMMUNICATION PARTNER | UE100-2 | UE100-1 |
| DISTANCE BETWEEN UE THAT IS ESTABLISHING CONNECTION WITH eNB 200 AND COMMUNICATION PARTNER UE | X [m] | X [m] |
| POSSIBILITY OF D2D COMMUNICATION | POSSIBLE | POSSIBLE |
| DURING D2D COMMUNICATION | — | — |

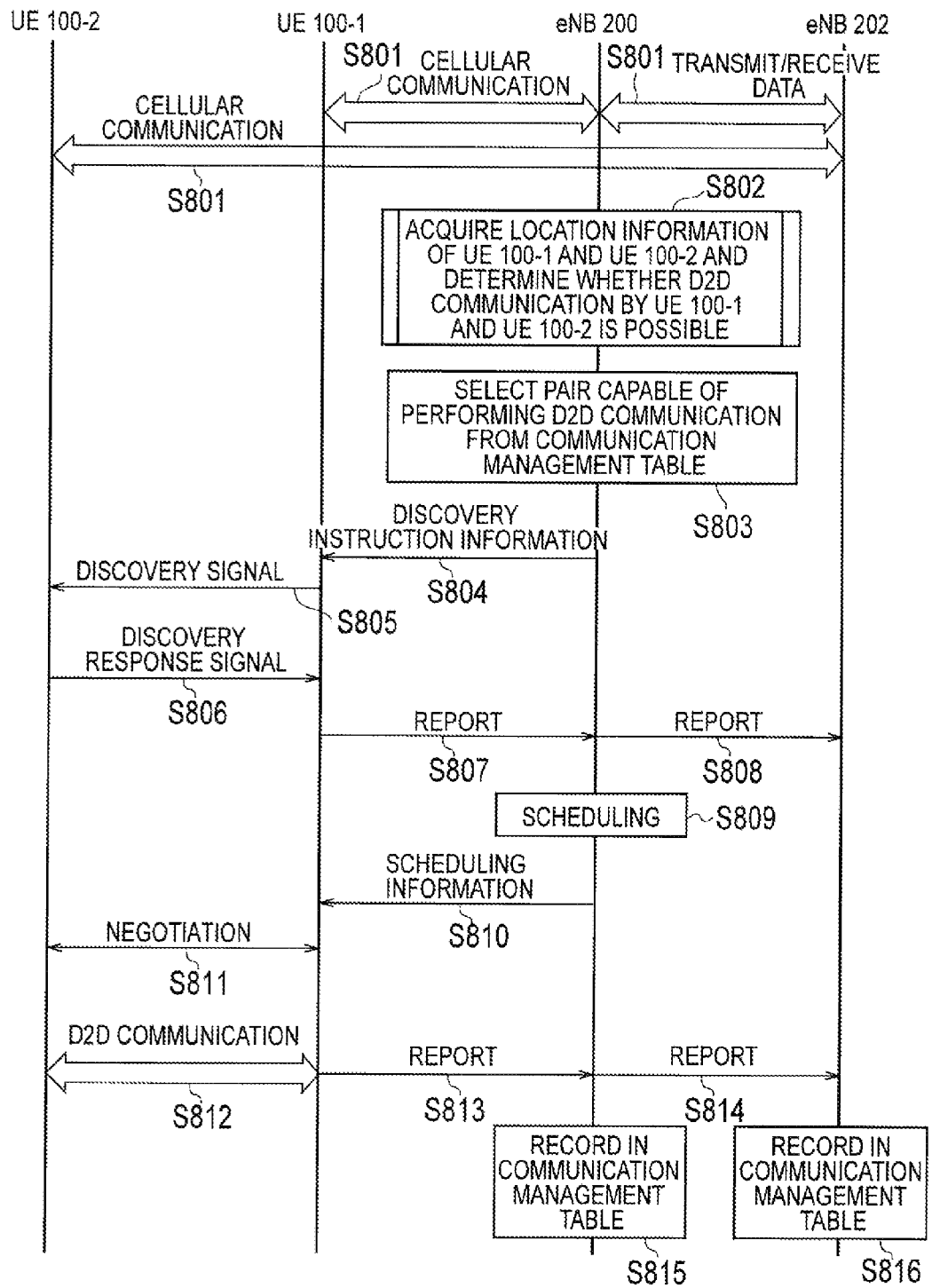

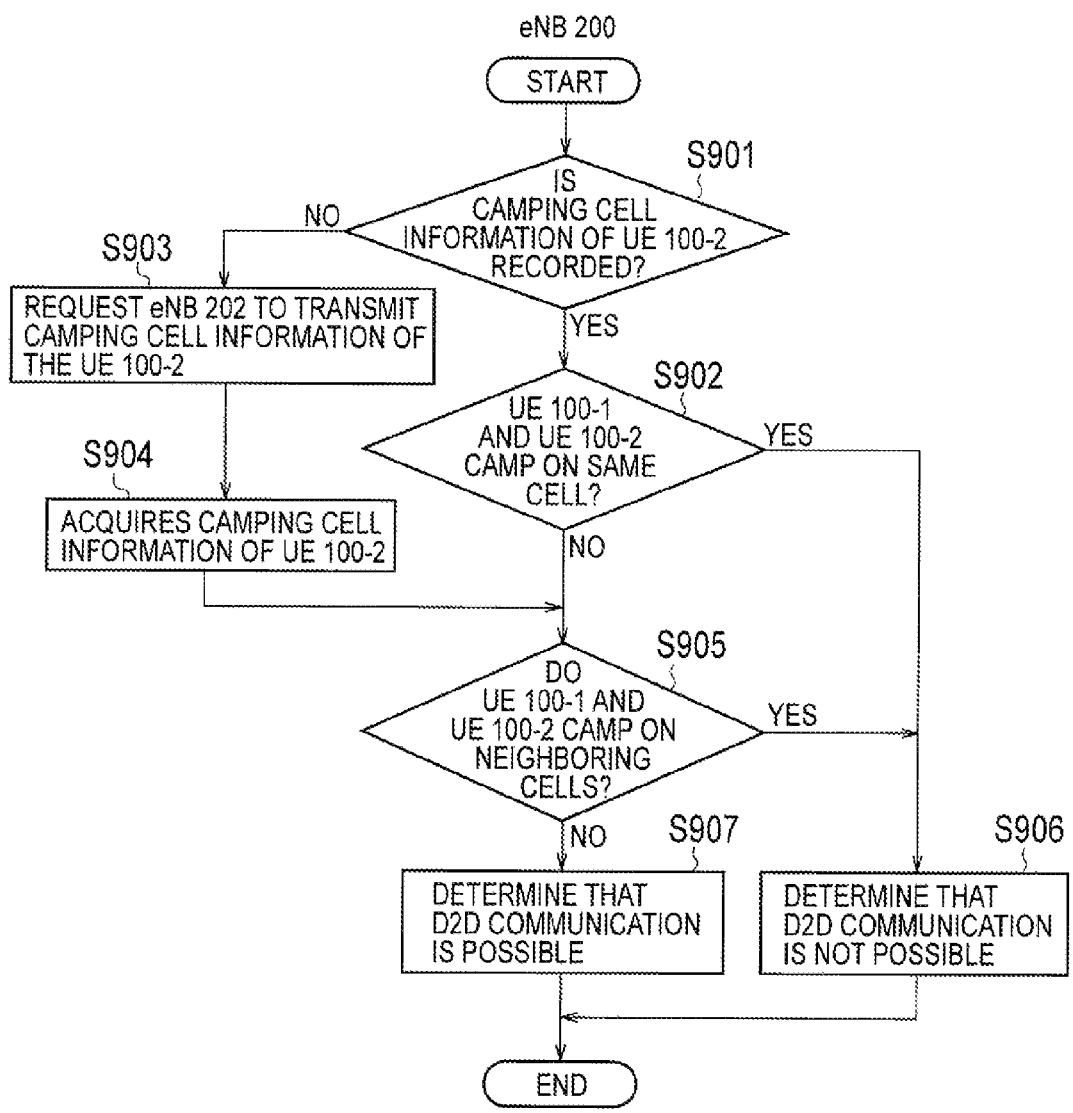

MOBILE COMMUNICATION SYSTEM, BASE STATION, PROCESSOR, AND USER TERMINAL

TECHNICAL FIELD

The present invention relates to a mobile communication system that supports D2D communication, a base station, a processor, and a user terminal.

BACKGROUND ART

In 3GPP (3rd Generation Partnership Project) which is a project aiming to standardize a mobile communication system, the introduction of Device to Device (D2D) communication is discussed as a new function after Release 12 (see non patent document 1).

In the D2D communication, a plurality of user terminals close to one another perform direct radio communication in a frequency band assigned to a mobile communication system. In addition, the D2D communication is also called Proximity Service communication.

PRIOR ART DOCUMENT

Non-Patent Document

Non Patent Document 1: 3GPP technical report "TR 22.803 V0.3.0" May 2012

SUMMARY OF THE INVENTION

In the current specifications, since there is no scheme for appropriately controlling the D2D communication, there is a problem that it is not possible to effectively utilize the D2D communication.

Therefore, the present invention provides a mobile communication system capable of effectively utilizing D2D communication, a base station thereof, a processor thereof, and a user terminal thereof.

According to an embodiment, a mobile communication system comprises: a base station, a first user terminal that establishes a connection with the base station, and a second user terminal that performs communication with the first user terminal via the base station, the mobile communication system supporting D2D communication that is direct device to device communication. When it is determined that the D2D communication by the first user terminal and the second user terminal is possible, the base station transmits, to the first user terminal, an instruction for having a signal for discovery transmitted. The signal for discovery is used in discovery of a communication partner terminal in the D2D communication.

BRIEF DESCRIPTION OF THE DRAWINGS

FIG. 6 illustrates a data path in cellular communication.
FIG. 7 illustrates a data path in D2D communication.
FIG. 18 is an example of an entire operation sequence diagram according to the third embodiment.
FIG. 19 is a flowchart of an operation of acquiring location information and an operation for determining whether D2D communication is possible according to the third embodiment.

DESCRIPTION OF THE EMBODIMENT

Overview of Embodiment

Figure 1:
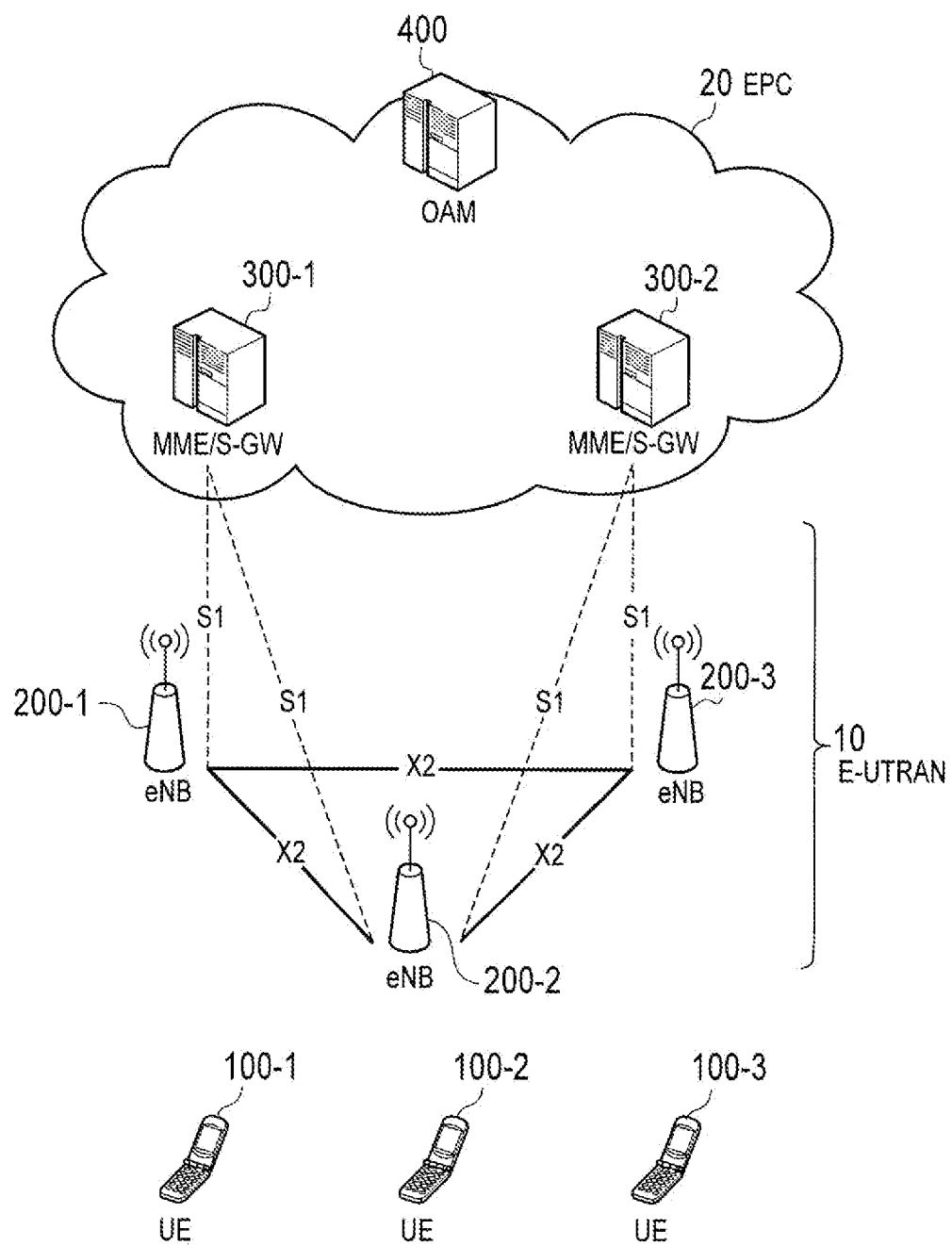
FIG. 1 is a configuration diagram of an LTE system.

A mobile communication system according to an embodiment includes abase station, a first user terminal that establishes a connection with the base station, and a second user terminal that performs communication with the first user terminal via the base station, and supports D2D communication that is direct device to device communication.

In the embodiment, when it is determined that the D2D communication by the first user terminal and the second user terminal is possible, the base station transmits, to the first user terminal, an instruction for having a signal for discovery transmitted, the signal for discovery being used in the discovery of a communication partner terminal in the D2D communication. In this way, when the first user terminal and the second user terminal perform communication, the base station allows the first user terminal to transmit the signal for discovery, thereby promoting the D2D communication by the first user terminal and the second user terminal. Instead of communication performed via the base station, the D2D communication by the first user terminal and the second user terminal is performed, so that it is possible to reduce a load of the base station. Consequently, it is possible to effectively utilize the D2D communication. In addition, the "discovery of the communication partner terminal" includes being discovered (Discoverable) by the communication partner terminal as well as discovering (Discover) the communication partner terminal.

In the embodiment, the mobile communication system includes a determination unit that determines whether the D2D communication by the first user terminal and the second user terminal is possible, wherein when it is estimated that the first user terminal and the second user terminal are close to each other on the basis of the location information of each of the first user terminal and the second user terminal, the determination unit determines that the D2D communication by the first user terminal and the second user terminal is possible. In this way, since it is highly probable that the first user terminal and the second user terminal are close to each other, it is highly probable that the second user terminal is able to receive a signal for discovery from the first user terminal, and the first user terminal does not need to transmit a wasteful signal for discovery.

In the embodiment, the determination unit is provided to the base station. In this way, the base station is able to directly determine whether the D2D communication by the first user terminal and the second user terminal is possible.

In other embodiments, the determination unit may be provided to an upper apparatus of the base station. In this way, even when the second user terminal establishes a connection with a neighboring base station adjacent to the base station, it is possible to determine whether the D2D communication by the first user terminal and the second user terminal is possible.

In a first embodiment, the location information includes direction information indicating the direction of each of the first user terminal and the second user terminal on the basis of the base station, and distance information indicating a distance between each of the first user terminal and the second user terminal and the base station. In this way, it is possible to designate the location of each of the first user terminal and the second user terminal, so that it is possible to improve the accuracy of determination regarding whether the D2D communication by the first user terminal and the second user terminal is possible.

In the first embodiment, the base station performs communication with each of the first user terminal and the second user terminal through multi-antenna transmission, and the direction information is decided in response to a directional pattern in the multi-antenna transmission. In this way, the base station is able to estimate the direction of each of the first user terminal and the second user terminal by utilizing the multi-antenna transmission.

In the first embodiment, the distance information is decided in response to a propagation delay time of each of the first user terminal and the second user terminal, which time is evaluated from a timing at which the base station receives an uplink signal transmitted from each of the first user terminal and the second user terminal. In this way, the base station is able to estimate the distance between each of the first user terminal and the second user terminal and the base station by utilizing an adjustment process (a timing advance process) of a transmission timing.

In the first embodiment, the distance information is decided in response to propagation loss of each of the first user terminal and the second user terminal, which loss is evaluated from the transmission power of an uplink signal transmitted from each of the first user terminal and the second user terminal and received power when the base station receives the uplink signal. In this way, the base station is able to estimate the distance between each of the first user terminal and the second user terminal and the base station by utilizing information on uplink transmission power control.

In a second embodiment, the location information includes information indicating the location of each of the first user terminal and the second user terminal, which information is evaluated by a global navigation satellite system. In this way, the location of each of the first user terminal and the second user terminal is accurately obtained, so that it is possible to improve the accuracy of determination regarding whether the D2D communication by the first user terminal and the second user terminal is possible.

In a third embodiment, the location information includes information indicating a cell on which each of the first user terminal and the second user terminal camps, and the determination unit determines that the D2D communication by the first user terminal and the second user terminal is possible when the second user terminal camps on a cell on which the first user terminal camps, or a neighboring cell adjacent to the cell on which the first user terminal camps. In this way, even when the location of each of the first user terminal and the second user terminal is not designated, the base station is able to determine whether the D2D communication by the first user terminal and the second user terminal is possible.

In the embodiment, the instruction includes information for designating a timing at which the signal for discovery is transmitted. In this way, the base station is able to control the timing at which the signal for discovery is transmitted.

In the third embodiment, the mobile communication system comprises a neighboring base station adjacent to the base station, wherein when the second user terminal establishes a connection with the neighboring base station, the base station acquires the location information of the second user terminal from the neighboring base station. In this way, the base station is able to acquire the location information of the second user terminal that establishes no connection with the base station, resulting in the expansion of an area where it can be determined that the D2D communication is possible.

In the embodiment, when the instruction was received, the first user terminal stops the transmission of data to the base station. In this way, during preparation for performing the D2D communication, since the first user terminal does not need to transmit data to the base station, it is possible to reduce a load of the first user terminal.

In the embodiment, a base station in a mobile communication system, which supports D2D communication that is direct device to device communication, comprises: a control unit that transmits, to a first user terminal, an instruction for having a signal for discovery transmitted when it is determined that the D2D communication by the first user terminal and a second user terminal is possible, the first user terminal establishing a connection with the base station, the second user terminal performing communication with the first user terminal via the base station, the signal for discovery being used in discovery of a communication partner terminal in the D2D communication.

In the embodiment, a processor, which is provided in a base station in a mobile communication system that supports the D2D communication that is direct device to device communication, executes: a process of transmitting, to a first user terminal, an instruction for having a signal for discovery transmitted when it is determined that the D2D communication by the first user terminal and a second user terminal is possible, the first user terminal establishing a connection with the base station, the second user terminal performing communication with the first user terminal via the base station, the signal for discovery being used in discovery of a communication partner terminal in the D2D communication.

In the embodiment, a user terminal, which establishes a connection with a base station in a mobile communication system that supports D2D communication that is direct device to device communication, comprises: a reception unit that receives an instruction transmitted from the base station when it is determined that the D2D communication by the user terminal and another user terminal is possible, the other user terminal performing communication with the user terminal via the base station; and a control unit that transmits a signal for discovery, which is used in discovery of a communication partner terminal in the D2D communication, when the reception unit has received the instruction, wherein the instruction is an instruction for having the signal for discovery transmitted.

In the embodiment, a processor, which is provided in a user terminal that establishes a connection with a base station in a mobile communication system that supports D2D communication that is direct device to device communication, comprises: a process of receiving an instruction transmitted from the base station when it is determined that the D2D communication by the user terminal and another user terminal is possible, the other user terminal performing communication with the user terminal via the base station; and a process of transmitting a signal for discovery, which is used in discovery of a communication partner terminal in the D2D communication, when the reception unit has received the instruction, wherein the instruction is an instruction for having the signal for discovery transmitted.

Hereinafter, with reference to the accompanying drawings, the following description will be provided for each embodiment when D2D communication is introduced to a cellular mobile communication system (hereinafter, an "LTE system") configured according to 3GPP standards.

First Embodiment

Hereinafter, a first embodiment will be described.
(LTE system)
FIG. 1 is a configuration diagram of an LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMES (Mobility Management Entities)/S-GWs (Serving-Gateways) 300, and OAM 400 (Operation and Maintenance).

The MME is a network node for performing various mobility controls, for example, for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
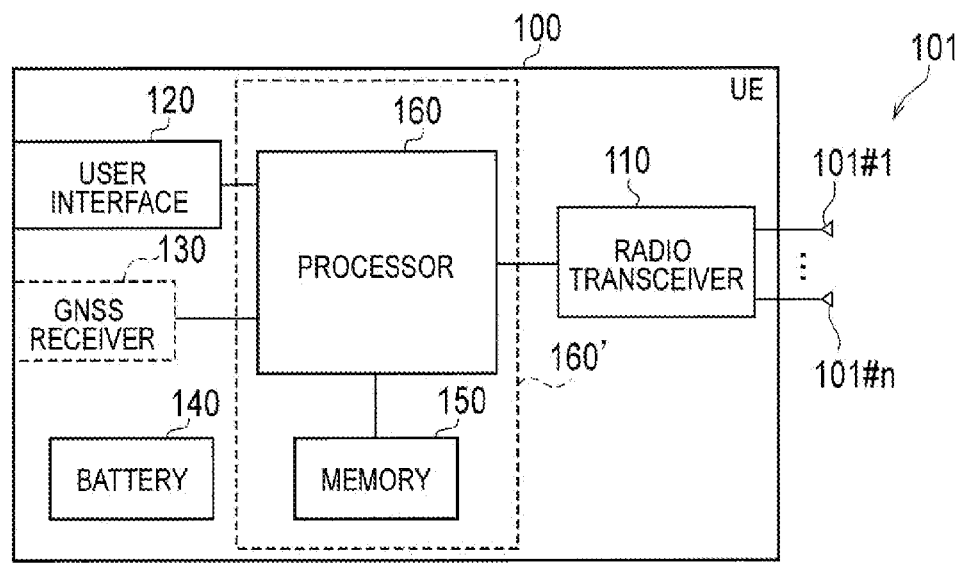
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements 101 #1 to 101 #n. The radio transceiver 110 performs signal processing on a baseband signal output from the processor 160, performs up-conversion, amplification and the like, and transmits a radio signal from the antenna 101. Furthermore, the radio transceiver 110 performs amplification and down-conversion of a radio signal received by the antenna 101, performs signal processing on a baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
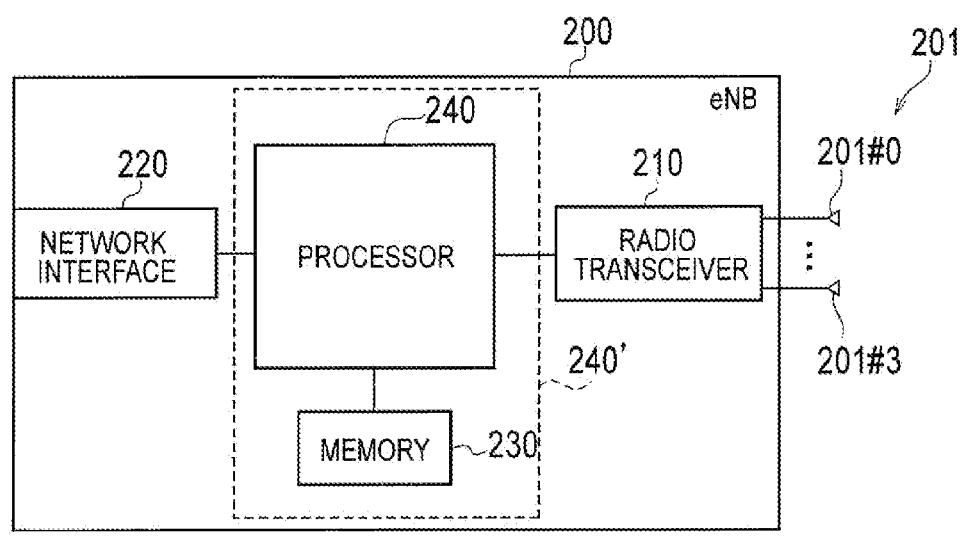
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit. Furthermore, the memory 230 and the processor 240 constitute a determination unit. In addition, the memory 230 is integrated with the processor 240, and this set (that is, a chipset) may be called a processor 240'.

The antenna 201 includes a plurality of antenna elements 201#0 to 201#3. The antenna 201 and the radio transceiver 210 are used to transmit and receive a radio signal. The radio transceiver 210 performs signal processing on a baseband signal output from the processor 240, performs up-conversion, amplification and the like, and transmits a radio signal from the antenna 201. Furthermore, the radio transceiver 210 performs amplification, down-conversion and the like of a received signal, performs signal processing on a baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, encoding and decoding and the like of the baseband signal and a CPU that performs various processes by executing the program stored in the memory 230. The processor 240 implements various processes and various communication protocols described later.

Figure 4:
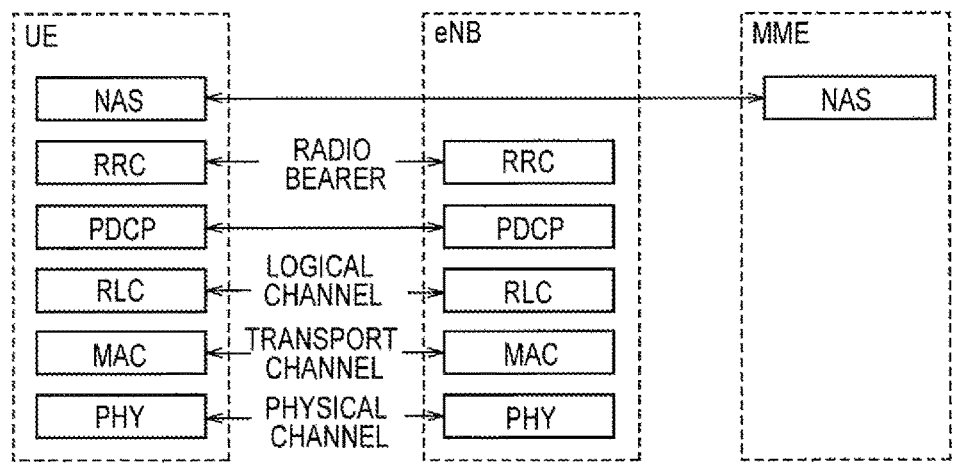
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a transport format of an uplink and a downlink (a transport block size, a modulation and coding scheme and the like) and a MAC scheduler for determining a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management and mobility management, for example.

Figure 5:
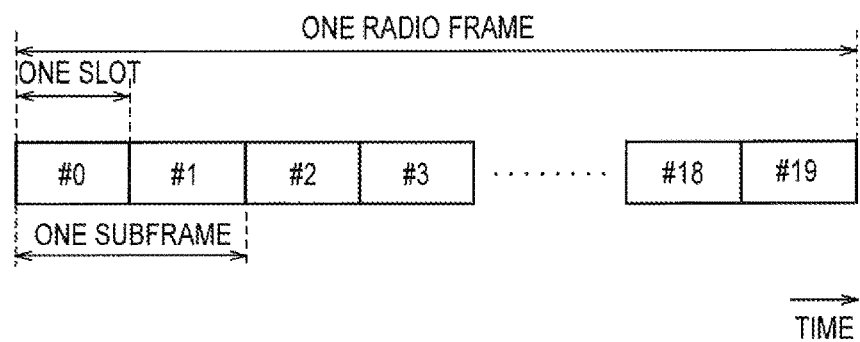
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Moreover, in each subframe, cell-specific reference signals (CRSs) are distributed and arranged.

The PDCCH carries a control signal. The control signal, for example, includes uplink SI (Scheduling Information), downlink SI, and a TPC bit. The uplink SI indicates the assignment of an uplink frequency and time resource and the downlink SI indicates the assignment of a downlink frequency and time resource. The TPC bit is a signal for instructing increase or decrease in uplink transmission power.

The PDSCH carries a control signal and/or user data. For example, a downlink data region may be assigned only to the user data, or assigned such that the user data and the control signal are multiplexed.

In the uplink, both end portions in the frequency direction of each subframe are control regions mainly used as a physical uplink control channel (PUCCH). Furthermore, the center portion in the frequency direction of each subframe is a region that can be mainly used as a physical uplink shared channel (PUSCH). Moreover, in each subframe, a demodulation reference signal (DMRS) and a sounding reference signal (SRS) are arranged.

The PUCCH carries a control signal. The control signal, for example, includes PMI (Precoding Matrix Indicator).

The PUSCH is a physical channel for carrying a control signal and/or user data. For example, an uplink data region may be assigned only to the user data, or assigned such that the user data and the control signal are multiplexed.

(D2D Communication)

Next, a description is given with comparing the D2D communication with the normal communication (the cellular communication) in the LTE system.

FIG. 6 is a diagram illustrating a data path in the cellular communication. In this case, FIG. 6 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 6, the data path of the cellular communication passes through the network. Specifically, the data path is set to pass through the eNB 200-1, the S-GW 300, and the eNB 200-2.

FIG. 7 is a diagram illustrating a data path in the D2D communication. In this case, FIG. 7 illustrates the case in which the D2D communication is performed between the UE 100-1 that establishes a connection with the eNB 200-1 and the UE 100-2 that establishes a connection with the eNB 200-2.

As illustrated in FIG. 7, the data path of the D2D communication does not pass through the network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced, for example. In addition, in a mode called Locally Routed, a data path goes through the eNB 200 without going through the S-GW 300.

It is noted that cases in which the D2D communication is started include (a) a case in which the D2D communication is started after a partner terminal is discovered by performing an operation for discovering a partner terminal, and (b) a case in which the D2D communication is started without performing an operation for discovering a partner terminal.

For example, in the above-described case (a), one UE 100 of the UE 100-1 and the UE 100-2 discovers the other UE 100 existing in the proximity of the one UE 100, so that the D2D communication is started.

In such a case, in order to discover the proximal terminal, the UE 100 has a (Discover) function of discovering another UE 100 existing in the proximity of the UE 100, and/or a (Discoverable) function of being discovered by another UE 100.

It is noted that the UE 100 need not necessarily perform the D2D communication even upon discovering a partner terminal. For example, after mutually discovering each other, the UE 100-1 and the UE 100-2 may perform a negotiation, and determine whether or not to perform the D2D communication. When each of the UE 100-1 and the UE 100-2 agrees to perform the D2D communication, the D2D communication starts.

On the other hand, in the above-described case (b), for example, the UE 100-1 starts broadcasting a signal for the D2D communication. Thus, the UE 100 is capable of starting the D2D communication regardless of the existence of the discovery of a partner terminal.

(Operation of Mobile Communication System According to First Embodiment)

Next, an operation of the mobile communication system according to the first embodiment will be described in sequence of (1) Entire operation, (2) Operation of eNB 200, (3) Operation of UE 100-1, and (4) Operation of UE 100-2.

(1) Entire Operation

Figures 8, 9:
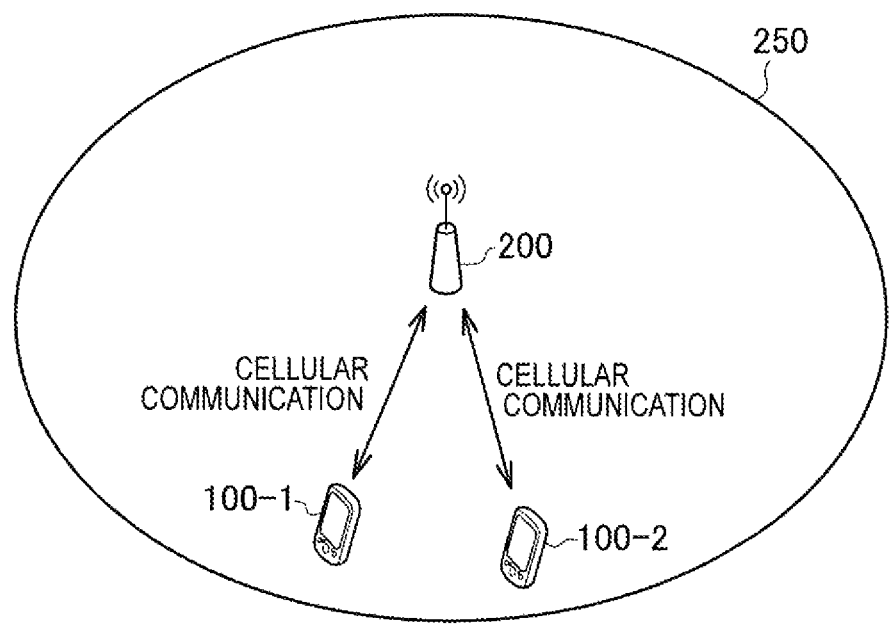
FIG. 8 is a diagram illustrating a positional relation between UE 100-1/UE 100-2 and eNB 200.
FIG. 9 is a diagram illustrating a communication management table.

With reference to FIG. 8 and FIG. 9, the entire operation will be described.

FIG. 8 is a diagram illustrating a positional relation between the UE 100-1/the UE 100-2 and the eNB 200.

As illustrated in FIG. 8, the UE 100-1 and the UE 100-2 exist in a cell 250 managed by the eNB 200. Furthermore, each of the UE 100-1 and the UE 100-2 establishes a connection with the eNB 200. The UE 100-1 and the UE 100-2 perform cellular communication via the eNB 200.

FIG. 9 is a diagram illustrating a communication management table according to the present embodiment. Furthermore, the communication management table is a table that records at least a determination result regarding whether D2D communication by a pair (the UE 100-1 and the UE 100-2) of UE 100 performing cellular communication is possible. The communication management table is managed by the eNB 200. That is, the communication management table is stored in the memory 230 of the eNB 200.

As illustrated in FIG. 9, in the present embodiment, the communication management table records "UE that is establishing a connection with eNB 200", "communication partner UE", "distance between the UE that is establishing a connection with eNB 200 and communication partner UE", "possibility of D2D communication", and "during D2D communication".

The "UE that is establishing a connection with eNB 200" indicates identification information of each UE 100 that is establishing a connection with the eNB 200. The "communication partner UE" indicates identification information of a user terminal that is a communication partner of each user terminal that is establishing a connection with the eNB 200. The "distance between the UE that is establishing a connection with eNB 200 and communication partner UE" indicates a distance between each user terminal that is establishing a connection with the eNB 200 and a user terminal that is a communication partner of the aforementioned each user terminal. The "possibility of D2D communication" indicates whether D2D communication by each user terminal that is establishing a connection with the eNB 200 is possible. The "during D2D communication" indicates whether each user terminal that is establishing a connection with the eNB 200 performs the D2D communication.

Figure 10:
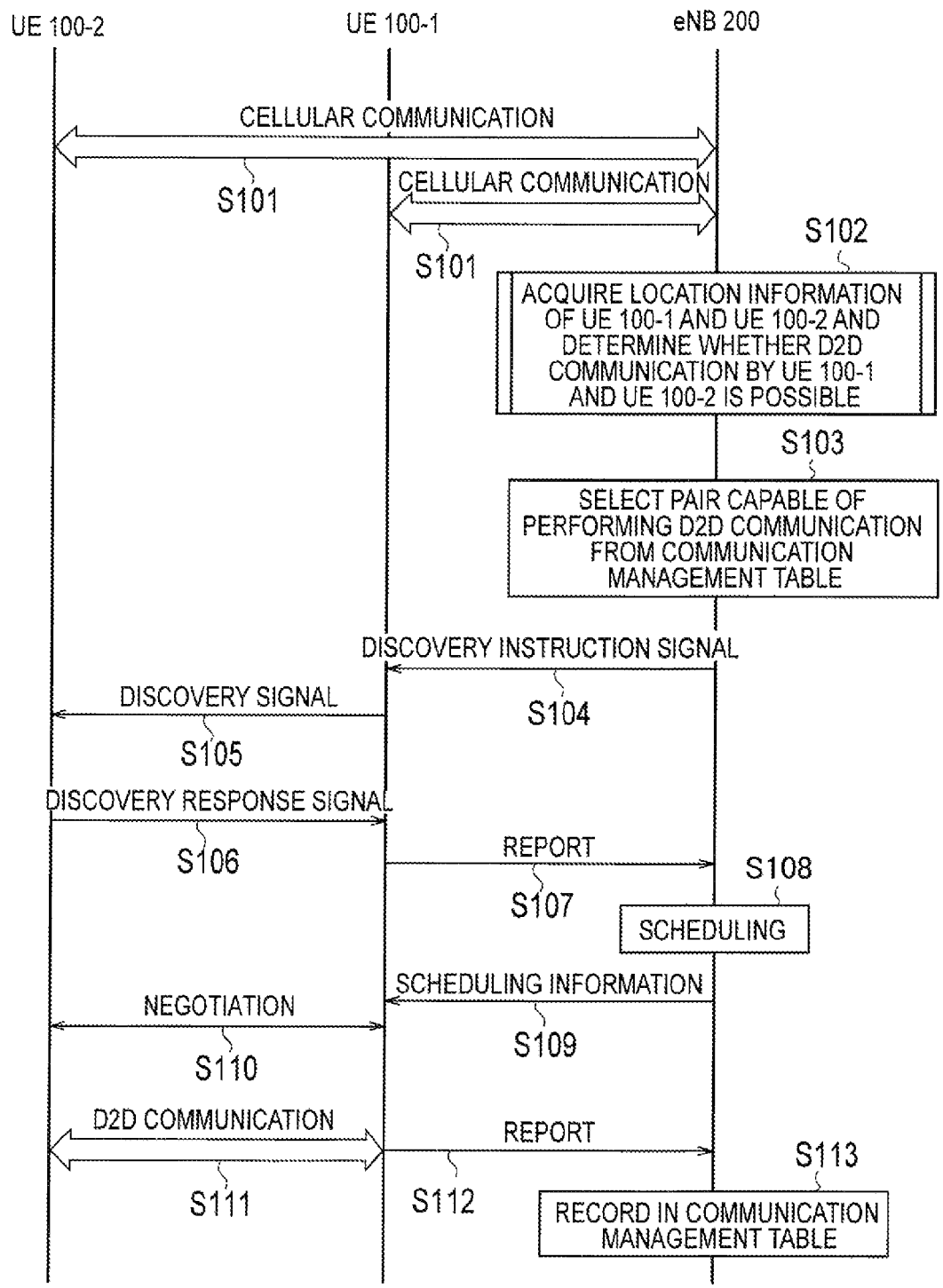
FIG. 10 is an example of an entire operation sequence diagram according to a first embodiment.

FIG. 10 is an example of an entire operation sequence diagram according to the first embodiment.

As illustrated in FIG. 10, in step 101, the UE 100-1 and the UE 100-2 perform cellular communication via the eNB200.

In step 102, the eNB 200 acquires the location information of each of the UE 100-1 and the UE 100-2. Details of an operation for acquiring the location information will be described later. Moreover, the eNB 200 determines whether D2D communication by the UE 100-1 and the UE 100-2 is possible. Specifically, when it is estimated that the UE 100-1 and the UE 100-2 are close to each other, the eNB 200 determines that D2D communication by the UE 100-1 and the UE 100-2 is possible on the basis of the location information of each of the UE 100-1 and the UE 100-2. A result obtained by determining whether the D2D communication by the UE 100-1 and the UE 100-2 is possible is recorded in the communication management table.

Hereinafter, a description will be given on the assumption that the eNB 200 estimates that the UE 100-1 and the UE 100-2 are a close to each other and thus determined that D2D communication by the UE 100-1 and the UE 100-2 is possible.

In step 103, the eNB 200 selects a pair capable of performing the D2D communication from the communication management table. In the present embodiment, the eNB 200 selects the UE 100-1 and the UE 100-2 as the pair capable of performing the D2D communication.

In step 104, the eNB 200 transmits a Discovery instruction signal that is an instruction for having at least one of the pair capable of performing the D2D communication transmit a Discovery signal. In addition, the Discovery signal corresponds to a signal for discovery that is used in the discovery of a communication partner terminal in the D2D communication.

In the present embodiment, the eNB 200 transmits the Discovery instruction signal to the UE 100-1. The UE 100-1 receives the Discovery instruction signal.

In step 105, the UE 100-1 which received the Discovery instruction signal transmits the Discovery signal. The UE 100-2 receives the Discovery signal.

In step 106, the UE 100-2 which received the Discovery signal transmits a response signal (hereinafter, a Discovery response signal) for the Discovery signal to the UE 100-1. The UE 100-1 receives the Discovery response signal.

In step 107, the UE 100-1 which received the Discovery response signal reports, to the eNB 200, the reception of the Discovery response signal from the UE 100-2.

In step 108, the eNB 200 which received the report performs scheduling. Specifically, the eNB 200 performs the assignment of a radio resource that is used in communication (the D2D communication) between the UE 100-1 and the UE 100-2.

In step 109, the eNB 200 transmits scheduling information to the UE 100-1. The scheduling information includes information indicating a radio resource assigned to the D2D communication between the UE 100-1 and the UE 100-2.

In step 110, the UE 100-1 and the UE 100-2 perform exchange (negotiation) of information that is used to establish a D2D link. Information that is used to establish the D2D link, for example, is the scheduling information.

In step 111, the D2D link is established between the UE 100-1 and the UE 100-2, and the UE 100-1 and the UE 100-2 perform the D2D communication.

In step 112, the UE 100-1 reports, to the eNB 200, the establishment of the D2D link between the UE 100-1 and the UE 100-2.

In step 113, the eNB 200 which received the report records, in the communication management table, that the UE 100-1 and the UE 100-2 are performing the D2D communication. Furthermore, the eNB 200 ends the cellular communication with the UE 100-1 and the UE 100-2.

(2) Operation of eNB 200

Next, the operation of the eNB 200 will be described in sequence of (2.1) Operation of acquiring location information and operation for determining whether D2D communication is possible, (2.2) Operation of switching from cellular communication to D2D communication, and (2.3) Operation of recording in communication management table.

Figure 11:
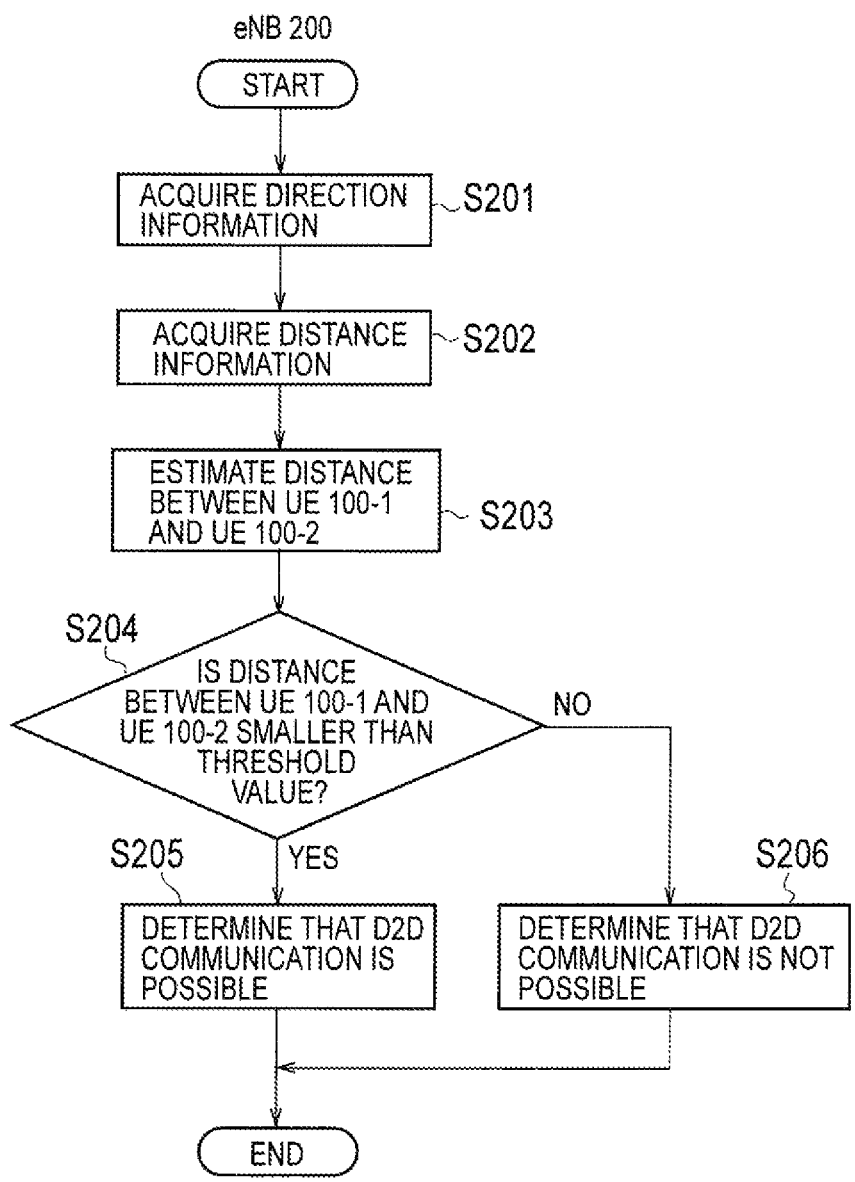
FIG. 11 is a flowchart of an operation of acquiring location information and an operation for determining whether D2D communication is possible according to the first embodiment.

(2.1) Operation of Acquiring Location Information and Operation for Determining Whether D2D Communication is Possible FIG. 11 is a flowchart of an operation of acquiring the location information and an operation for determining whether the D2D communication is possible according to the present embodiment. The present operation corresponds to step 102 in FIG. 10.

In the present embodiment, the location information includes direction information and distance information. The direction information includes information indicating the direction of each of the UE 100-1 and the UE 100-2 on the basis of the eNB 200. The distance information includes information indicating the distance between each of the UE 100-1 and the UE 100-2 and the eNB 200.

As illustrated in FIG. 11, in step 201, the processor 240 acquires the direction information. In the present embodiment, the direction information is decided in response to the directional pattern in the multi-antenna transmission.

Specifically, when beamforming is performed, information, which indicates a direction in which a beam is directed toward the UE 100-1, is employed as the direction information of the UE 100-1. When null steering is performed, information, which indicates a direction in which a null is directed toward the UE 100-1, is employed as the direction information. The same manner is also applied to the direction information of the UE 100-2. In addition, when PMI is fed back from each of the UE 100-1 and the UE 100-2, beamforming and/or null steering is performed on the basis of the PMI fed back.

Through the above process, the processor 240 acquires the direction information indicating the direction of each of the UE 100-1 and the UE 100-2.

Next, as illustrated in FIG. 11, in step 202, the processor 240 acquires the distance information. In the present embodiment, the distance information is acquired using the following method of (A) or (B).

(A) Reception Timing

The distance information is decided in response to a propagation delay time of each of the UE 100-1 and the UE 100-2, which time is evaluated from the timing at which the eNB 200 receives an uplink signal (for example, DMRS or SRS) transmitted from each of the UE 100-1 and the UE 100-2.

Specifically, the processor 240 calculates the propagation delay time from a timing advance value (TA) of the UE 100-1 that is used in the adjustment of an uplink transmission timing. The processor 240 calculates the distance between the UE 100-1 and the eNB 200 by the calculated propagation delay time of the UE 100-1 and a propagation speed of an uplink signal of the UE 100-1. The memory 230 stores the calculated distance between the UE 100-1 and the eNB 200 as the distance information of the UE 100-1. In the same manner, the processor 240 calculates the distance between the UE 100-2 and the eNB 200, and the memory 230 stores the calculated distance between the UE 100-2 and the eNB 200 as the distance information of the UE 100-2.

(B) Received Power

The distance information is decided in response to propagation loss of each of the UE 100-1 and the UE 100-2, which loss is evaluated from transmission power of the uplink signal (for example, DMRS or SRS) transmitted from each of the UE 100-1 and the UE 100-2, and received power when the eNB 200 receives the uplink signal.

The processor 240 calculates propagation loss from information on uplink transmission power control. Specifically, the processor 240 calculates the propagation loss of the UE 100-1 from the difference between the transmission power of the uplink signal transmitted from the UE 100-1 and the received power when the eNB 200 receives the uplink signal. The processor 240 calculates the distance between the UE 100-1 and the eNB 200, which corresponds to the calculated propagation loss. As the propagation loss is larger, the distance between the UE 100-1 and the eNB 200 becomes longer. The memory 230 stores the calculated distance between the UE 100-1 and the eNB 200 as the distance information of the UE 100-1. In the same manner, the memory 230 stores the distance between the UE 100-2 and the eNB 200 as the distance information of the UE 100-2.

Next, as illustrated in FIG. 11, in step 203, the processor 240 estimates the distance between the UE 100-1 and the UE 100-2.

Specifically, the processor 240 estimates the location of the UE 100-1 from the direction information of the UE 100-1, which was calculated in step 201, and the distance information of the UE 100-1, which was calculated in step 202. In the same manner, the processor 240 estimates the location of the UE 100-2.

In addition, the estimated locations of each of the UE 100-1 and the UE 100-2 may be recorded in the communication management table.

Based on the estimated location of the UE 100-1 and the estimated location of the UE 100-2, the processor 240 estimates the distance between the UE 100-1 and the UE 100-2.

In step 204, the processor 240 determines whether the distance between the UE 100-1 and the UE 100-2 is smaller than a predetermined threshold value. The processor 240 performs a process of step 205 when the distance between the UE 100-1 and the UE 100-2 is smaller than the predetermined threshold value, and performs a process of step 206 when the distance between the UE 100-1 and the UE 100-2 is equal to or more than the predetermined threshold value.

Furthermore, as the predetermined threshold value, it is possible to appropriately select a value indicating a distance of a range in which a Discovery signal transmitted from one user terminal (the UE 100-1) can be received by the other user terminal (the UE 100-2).

In step 205, the processor 240 estimates that the UE 100-1 and the UE 100-2 are close to each other, and determines that the UE 100-1 and the UE 100-2 are able to perform the D2D communication.

In step 206, the processor 240 estimates that the UE 100-1 and the UE 100-2 are not close to each other, and determines that the UE 100-1 and the UE 100-2 are not able to perform the D2D communication.

(2.2) Operation of Switching from Cellular Communication to D2D Communication

Figure 12:
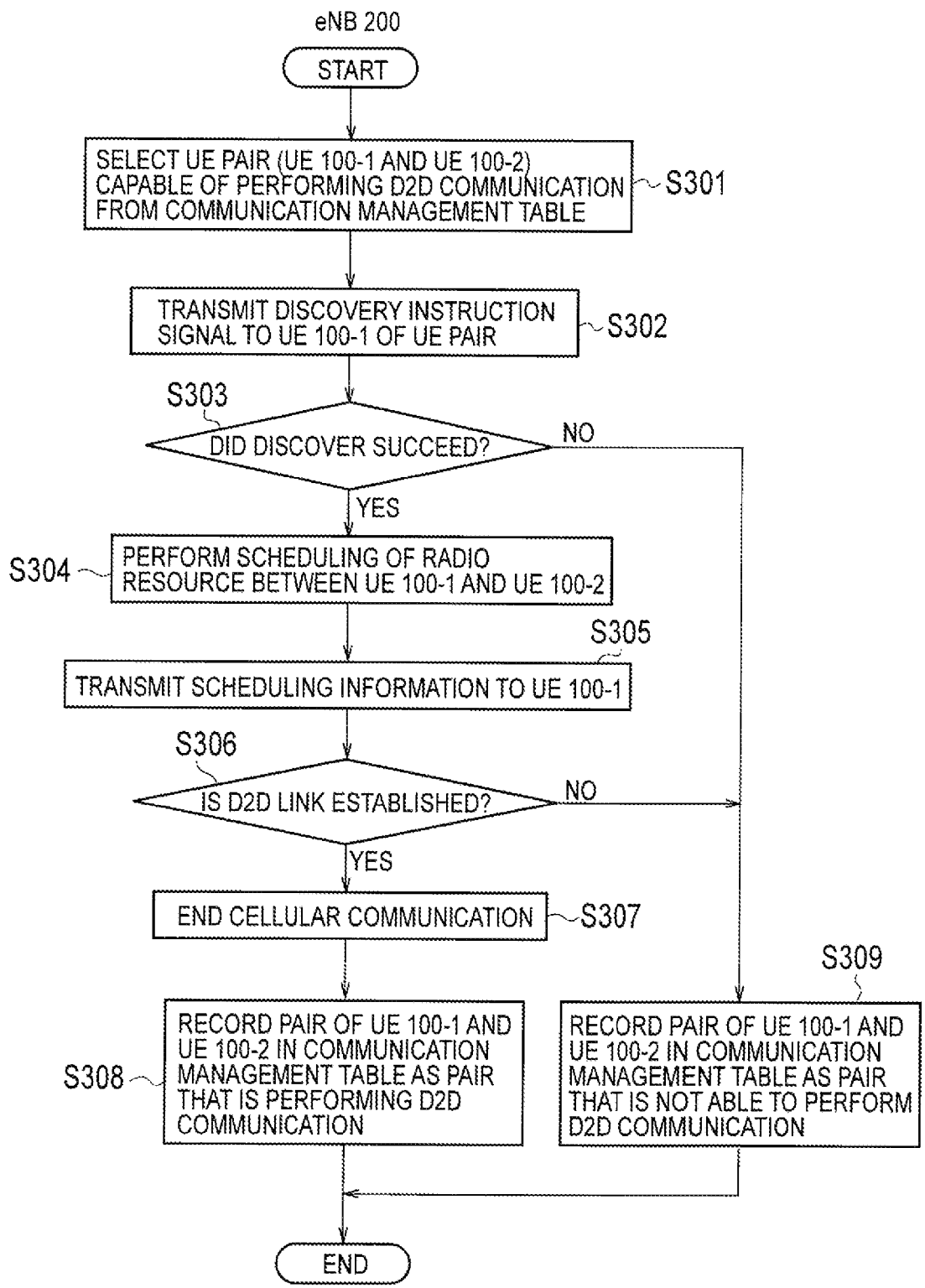
FIG. 12 is a flowchart of an operation by eNB 200 of switching from cellular communication to D2D communication according to the first embodiment.

FIG. 12 is a flowchart of an operation by the eNB 200 of switching from cellular communication to D2D communication. The present operation corresponds to from step 103 to step 113 of FIG. 10.

As illustrated in FIG. 12, in step 301, the processor 240 selects a UE pair capable of performing the D2D communication from the communication management table. The processor 240 may select the UE pair capable of performing the D2D communication from the communication management table by employing, as a trigger, the fact that the D2D communication was determined to be possible. Alternatively, the processor 240 may select the UE pair capable of performing the D2D communication from the communication management table by employing, as a trigger, the fact that a traffic amount of the eNB 200 exceeded a predetermined threshold value.

Hereinafter, a description will be given on the assumption that the processor 240 selected the pair of the UE 100-1 and the UE 100-2 from the communication management table as the UE pair capable of performing the D2D communication.

As illustrated in FIG. 12, in step 302, the processor 240 controls the radio transceiver 210 to transmit the Discovery instruction signal to the UE 100-1 of the pair of the UE 100-1 and the UE 100-2. In addition, the processor 240 may control the radio transceiver 210 to transmit the Discovery instruction signal to the UE 100-2 or may also control the radio transceiver 210 to transmit the Discovery instruction signal to both of the selected pair.

Furthermore, the Discovery instruction signal may include information for designating the timing at which the Discovery signal is transmitted. The information, for example, may include information for having the Discovery signal transmitted after a predetermined time lapses from the reception of the Discovery instruction signal. Furthermore, the information may include information for having the Discovery signal periodically transmitted.

Furthermore, the Discovery instruction signal may include information for stopping the transmission of data from the UE 100-1 to the eNB 200. Specifically, the Discovery instruction signal may also include information indicating that it is sufficient even though the UE 100-1 transmits no payload until a Discovery response signal, which will be described later, is received after the Discovery signal is transmitted (during a Discover operation). Alternatively, the Discovery instruction signal may also include information for preventing the UE 100-1 from decoding PDCCH, which was designated by the eNB 200, during the Discover operation.

In step 303, the processor 240 determines whether the UE 100-1 succeeded in Discover, that is, whether the UE 100-1 succeeded in discovering the UE 100-2 that is a communication partner of the UE 100-1.

Specifically, when the radio transceiver 210 received, from the UE 100-1, a report indicating the reception of the Discovery response signal from the UE 100-2, the processor 240 determines that Discover succeeded. In this case (in the case of "Yes" in step 303), the processor 240 proceeds to a process of step 304.

Meanwhile, when the radio transceiver 210 receives no report indicating the reception of the Discovery response signal until a predetermined time lapses, or when the radio transceiver 210 received, from the UE 100-1, a report indicating it was not possible to receive the Discovery response signal from the UE 100-2, the processor 240 determines Discover failed. In this case (in the case of "No" in step 303), the processor 240 proceeds to a process of step 309.

In step 304, the processor 240 performs scheduling of a radio resource between the UE 100-1 and the UE 100-2. That is, the processor 240 assigns a radio resource to the D2D communication between the UE 100-1 and the UE 100-2.

In step 305, the processor 240 controls the radio transceiver 210 to transmit scheduling information indicating the radio resource assigned to the D2D communication between the UE 100-1 and the UE 100-2.

In step 306, the processor 240 determines whether the UE 100-1 and the UE 100-2 established a D2D link.

Specifically, when the radio transceiver 210 received, from the UE 100-1, a report indicating that the UE 100-1 and the UE 100-2 established the D2D link, the processor 240 determines that the UE 100-1 and the UE 100-2 established the D2D link. In this case (in the case of "Yes" in step 306), the processor 240 proceeds to a process of step 307.

Meanwhile, when the radio transceiver 210 receives, from the UE 100-1, no report indicating that the UE 100-1 and the UE 100-2 established the D2D link until a predetermined time lapses, or when the radio transceiver 210 received, from the UE 100-1, a report indicating it was not possible to establish the D2D link, the processor 240 determines that it is not possible to establish the D2D link. In this case (in the case of "No" in step 306), the processor 240 proceeds to a process of step 309.

In step 307, the processor 240 performs a process of ending the cellular communication with the UE 100-1 and the UE 100-2.

In step 308, the processor 240 records the pair of the UE 100-1 and the UE 100-2 in the communication management table as a pair that is performing the D2D communication.

Meanwhile, in step 309, the processor 240 records the pair of the UE 100-1 and the UE 100-2 in the communication management table as a pair that is not able to perform the D2D communication.

(2.3) Recording in Communication Management Table

Figure 13:
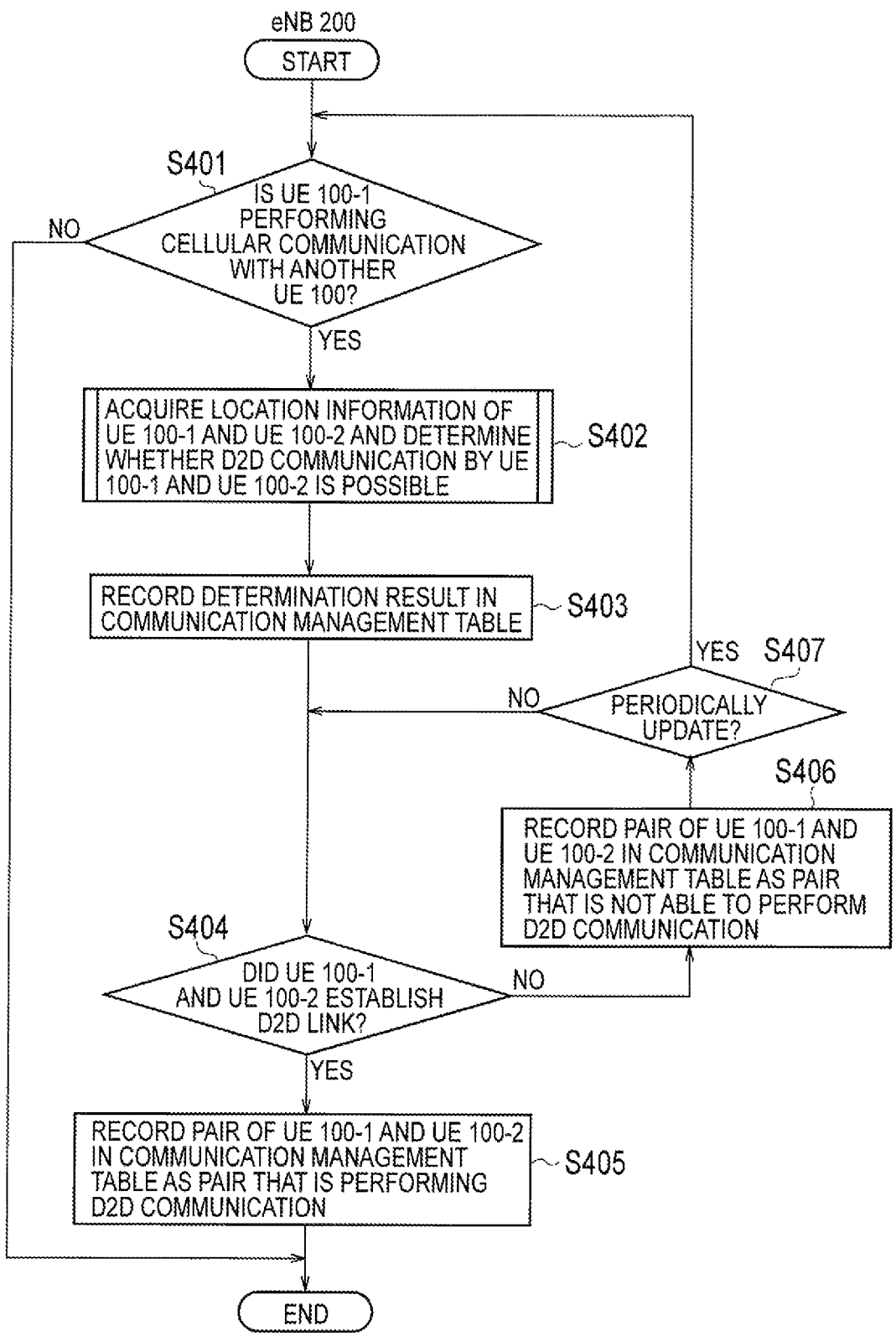
FIG. 13 is a flowchart of an operation of recording in a communication management table of eNB 200 according to the first embodiment.

With reference to FIG. 13, an operation by the eNB 200 of recording in and updating the communication management table will be described. FIG. 13 a flowchart of the operation by the eNB 200 of recording in the communication management table.

As illustrated in FIG. 13, in step 401, the processor 240 determines whether the UE 100-1 establishing a connection with the eNB 200 is performing cellular communication with another UE 100. Specifically, the processor 240 inquires of an upper apparatus (for example, MME) about whether the UE 100-1 is performing the cellular communication with the other UE 100. Hereinafter, a description will be given on the assumption that the upper apparatus is the MME.

In order to determine whether the UE 100-1 is performing the cellular communication with the other UE 100, the processor 240 acquires information on a communication partner of the UE 100-1 from the MME. Furthermore, the processor 240 may request the UE 100-1 to transmit identification information of the communication partner to the eNB 200.

When the other UE 100 which establishes a connection with the eNB 200 is performing the cellular communication with the UE 100, the processor 240 performs a process of step 402. Meanwhile, when the UE 100 which establishes a connection with the eNB 200 is not performing the cellular communication with the other UE 100, the processor 240 does not perform recording in the communication management table.

In the present embodiment, since the UE 100-1 and the UE 100-2 are performing the cellular communication, the processor 240 performs the process of step 402.

In step 402, as with the aforementioned "(2.1) operation of acquiring location information and operation for determining whether D2D communication is possible", the processor 240 acquires the location information of the UE 100-1 and the UE 100-2 and performs determination regarding whether the UE 100-1 and the UE 100-2 are able to perform the D2D communication.

In step 403, the processor 240 records a determination result of step 402 in the communication management table.

In step 404, the processor 240 determines whether the UE 100-1 and the UE 100-2 established a D2D link. That is, step 404 corresponds to step 306 of FIG. 12.

When it is determined that the UE 100-1 and the UE 100-2 established the D2D link, the processor 240 performs a process of step 405. Meanwhile, when it is determined that the UE 100-1 and the UE 100-2 are not able to establish the D2D link, the processor 240 performs a process of step 406.

In step 405, the processor 240 records the pair of the UE 100-1 and the UE 100-2 in the communication management table as a pair that is performing the D2D communication. Step 405 corresponds to step 308 of FIG. 12.

Meanwhile, in step 406, the processor 240 records the pair of the UE 100-1 and the UE 100-2 in the communication management table as a pair that is not able to perform the D2D communication. Step 406 corresponds to step 309 of FIG. 12.

In step 407, the processor 240 determines whether to periodically update the communication management table. For example, when a predetermined time is reached, the processor 240 may determine to periodically update the communication management table. If a predetermined time lapses from the cellular communication of UE 100 (the UE 100-1 and the UE 100-2) during the cellular communication, the processor 240 may determine to periodically update the communication management table.

When it is determined to periodically update the communication management table, the processor 240 performs the process of step 401. Meanwhile, when it is determined not to periodically update the communication management table, the processor 240 performs the process of step 404.

(3) Operation of UE 100-1

Figure 14:
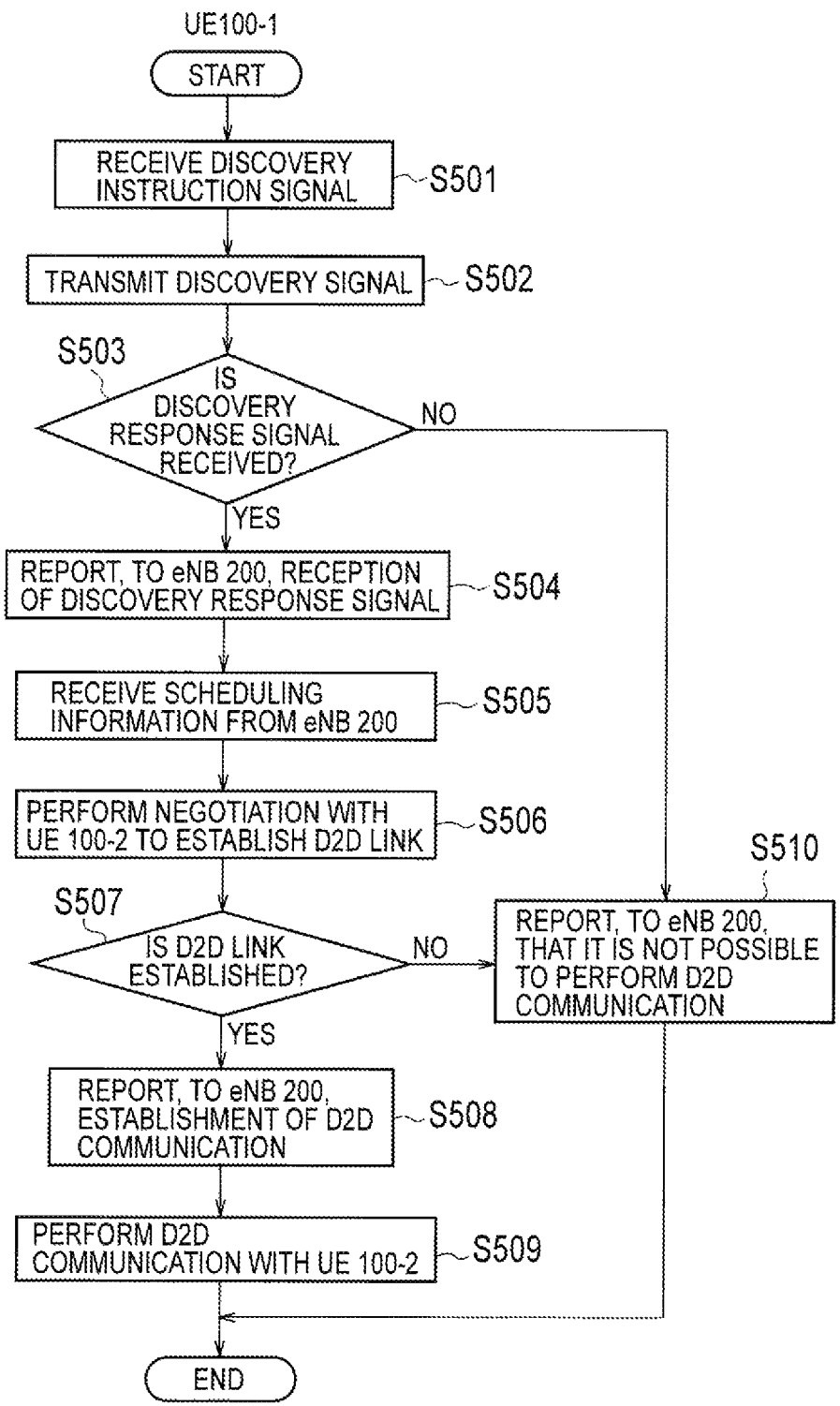
FIG. 14 is a flowchart illustrating an operation of the UE 100-1 according to the first embodiment.

Next, with reference to FIG. 14, the operation of the UE 100-1 will be described. FIG. 14 is a flowchart illustrating the operation of the UE 100-1 according to the first embodiment.

The UE 100-1 is performing the cellular communication with the UE 100-2 via the eNB 200. As illustrated in FIG. 14, in step 501, the radio transceiver 110 of the UE 100-1 receives a Discovery instruction signal from the eNB 200.

In step 502, the processor 160 controls the radio transceiver 110 to transmit a Discovery signal. In addition, the Discovery signal includes identification information for identifying the UE 100-1. The identification information, for example, includes a phone number and a fixed IP address. The identification information may include a country code and/or a random number, in addition to the phone number. Furthermore, the Discovery signal may include identification information for identifying the UE 100-2 that is a communication partner.

In addition, while the UE 100-1 is transmitting the Discovery signal (during a Discovery operation), there is a case in which the processor 160 is not able to perform another process due to a radio resource, a hardware configuration of the UE 100-1, a processing load of the processor 160, and the like. For example, when the performance of the processor 160 is low or when a processing load of another process is large, it is probable that the processor 160 is not able to perform the other process. Accordingly, for example, it is probable that the processor 160 is not able to control the Discovery signal and data to the eNB 200 to be simultaneously transmitted. In such a case, the processor 160 may not perform the other process during the Discovery operation. For example, the processor 160 may stop the transmission of data to the eNB 200. Specifically, during the Discovery operation, the processor 160 may control the radio transceiver 110 such that no payload is transmitted. Furthermore, the processor 160 may not decode designated PDCCH (for example, PDCCH designated from the eNB 200).

For example, when the processing load is equal to or more than a predetermined threshold value during the Discovery operation, the processor 160 may not perform the other process, or may not perform the other process on the basis of an instruction from the eNB 200. The instruction from the eNB 200, for example, includes a Discovery instruction signal that includes information indicating that it is sufficient even though the UE 100-1 transmits no payload or information indicating that it is sufficient even though the UE 100-1 does not decode PDCCH designated by the eNB 200, during the Discovery operation.

In step 503, the processor 160 determines whether a response signal (a Discovery response signal) indicating the reception of the Discovery signal by the UE 100-2 was received before a predetermined time lapses after the transmission of the Discovery signal. When the radio transceiver 110 was able to receive the Discovery response signal before the predetermined time lapses, the processor 160 performs a process of step 504. Meanwhile, when the radio transceiver 110 was not able to receive the Discovery response signal before the predetermined time lapses, the processor 160 performs a process of step 510.

In step 504, the processor 160 controls the radio transceiver 110 to report the reception of the Discovery response signal to the eNB 200.

In step 505, the radio transceiver 110 receives scheduling information from the eNB 200.

In step 506, the processor 160 performs exchange (negotiation) of information that is used to establish a D2D link with the UE 100-2, and establishes the D2D link. Specifically, firstly, the processor 160 controls the radio transceiver 110 to receive, from the UE 100-2, a signal indicating that communication is performed. Secondly, the processor 160 controls the radio transceiver 110 to transmit/receive data required for establishing the D2D link. Thirdly, the processor 160 establishes the D2D link corresponding to a radio resource assigned using scheduling information.

In step 507, the processor 160 determines whether the D2D link with the UE 100-2 was established. When the D2D link was established, the processor 160 performs a process of step 508. Meanwhile, when it was not able to establish the D2D link, the processor 160 performs the process of step 510.

In step 508, the processor 160 controls the radio transceiver 110 to report the establishment of the D2D link to the eNB 200.

In step 509, the processor 160 performs D2D communication with the UE 100-2, instead of the cellular communication.

Meanwhile, in step 510, when it was not able to receive the Discovery response signal in step 503 and when it was not able to establish the D2D link in step 507, the processor 160 controls the radio transceiver 110 to report, to the eNB 200, that it is not possible to perform the D2D communication. Furthermore, the processor 160 controls so that the cellular communication is performed with the UE 100-2.

(4) Operation of UE 100-2

Figure 15:
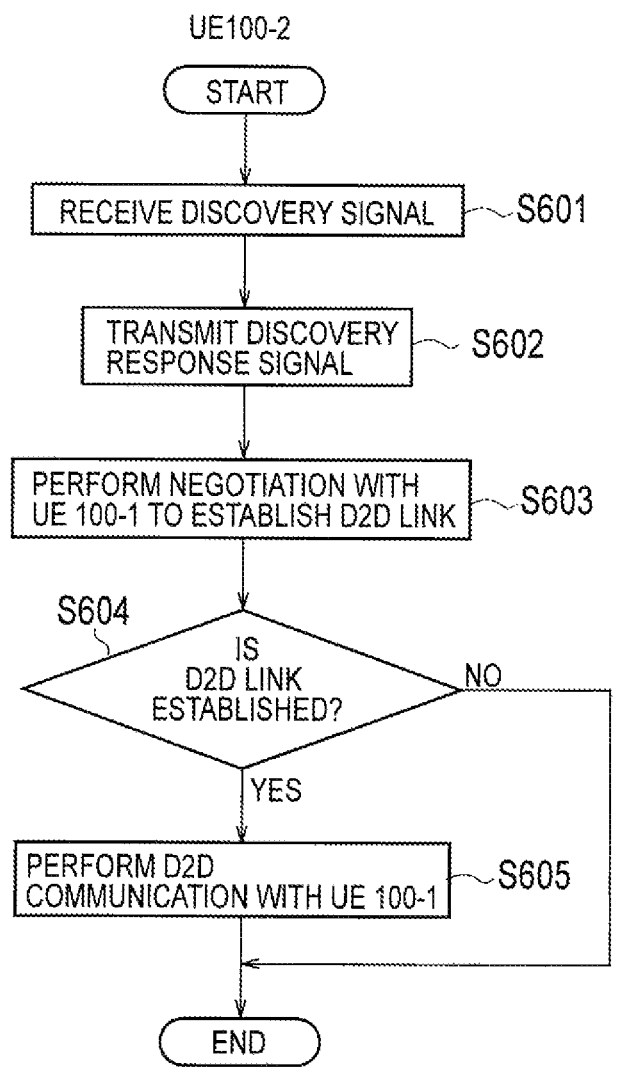
FIG. 15 is a flowchart illustrating an operation of the UE 100-2 according to the first embodiment.

With reference to FIG. 15, the operation of the UE 100-2 will be described. FIG. 15 is a flowchart illustrating the operation of the UE 100-2 according to the first embodiment.

As illustrated in FIG. 15, in step 601, the radio transceiver 110 of the UE 100-2 receives a Discovery signal from the UE 100-1.

In step 602, the processor 160 of the UE 100-2 controls the radio transceiver 110 to transmit a Discovery response signal to the UE 100-1.

In step 603, the processor 160 performs exchange (negotiation) of information that is used to establish a D2D link with the UE 100-1, and establishes the D2D link. Specifically, firstly, the processor 160 controls the radio transceiver 110 to transmit a signal indicating that D2D communication is performed. Secondly, the processor 160 controls the radio transceiver 110 to transmit/receive data required for establishing the D2D communication. Thirdly, the processor 160 establishes the D2D link corresponding to a radio resource assigned using scheduling information.

In step 604, the processor 160 determines whether the D2D link with the UE 100-1 was established. When the D2D link was established, the processor 160 performs a process of step 605. Meanwhile, when it was not able to establish the D2D link, the processor 160 controls so that the cellular communication is performed with the UE 100-1.

In step 605, the processor 160 performs D2D communication with the UE 100-1, instead of the cellular communication.

Summary of First Embodiment

When it is determined that the D2D communication by the UE 100-1 and the UE 100-2 is possible, the eNB 200 according to the present embodiment transmits, to the UE 100-1, a Discovery instruction signal for having a Discovery signal transmitted. In this way, when the UE 100-1 and the UE 100-2 are performing communication, the eNB 200 allows the UE 100-1 to transmit the Discovery signal, thereby promoting the D2D communication by the UE 100-1 and the UE 100-2. Instead of the cellular communication that is performed via the eNB 200, the D2D communication by the UE 100-1 and the UE 100-2 is performed, so that it is possible to reduce a load of the eNB 200. Consequently, it is possible to effectively utilize the D2D communication.

The eNB 200 according to the present embodiment includes the processor 240 that determines whether the D2D communication by the UE 100-1 and the UE 100-2 is possible, wherein when it is estimated that the UE 100-1 and the UE 100-2 are close to each other, the processor 240 determines that the D2D communication by the UE 100-1 and the UE 100-2 is possible, on the basis of the location information of each of the UE 100-1 and the UE 100-2. In this way, since it is highly probable that the UE 100-1 and the UE 100-2 are close to each other, it is highly probable that the UE 100-2 is able to receive a signal for discovery from the UE 100-1, and the UE 100-1 does not need to transmit a wasteful Discovery signal.

In the present embodiment, the location information includes direction information indicating the direction of each of the UE 100-1 and the UE 100-2 on the basis of the eNB 200, and distance information indicating a distance between each of the UE 100-1 and the UE 100-2 and the eNB 200. In this way, it is possible to designate the location of each of the UE 100-1 and the UE 100-2, so that it is possible to improve the accuracy of determination regarding whether the D2D communication by the UE 100-1 and the UE 100-2 is possible.

In the present embodiment, the determination unit is provided to the eNB 200. The eNB 200 is able to directly determine whether the D2D communication by the UE 100-1 and the UE 100-2 is possible.

The eNB 200 according to the present embodiment performs communication with each of the UE 100-1 and the UE 100-2 through multi-antenna transmission, and the direction information is decided in response to a directional pattern in the multi-antenna transmission. In this way, the eNB 200 is able to estimate the direction of each of the UE 100-1 and the UE 100-2 by utilizing the multi-antenna transmission.

In the present embodiment, the distance information is decided in response to a propagation delay time of each of the UE 100-1 and the UE 100-2, which time is evaluated from a timing at which the eNB 200 receives an uplink signal transmitted from each of the UE 100-1 and the UE 100-2. In this way, the eNB 200 is able to estimate the distance between each of the UE 100-1 and the UE 100-2 and the eNB 200 by utilizing an adjustment process (a timing advance process) of a transmission timing.

In the present embodiment, the distance information is decided in response to propagation loss of each of the UE 100-1 and the UE 100-2, which loss is evaluated from transmission power of an uplink signal transmitted from each of the UE 100-1 and the UE 100-2 and received power when the eNB 200 receives the uplink signal. In this way, the eNB 200 is able to estimate the distance between each of the UE 100-1 and the UE 100-2 and the eNB 200 by utilizing information on uplink transmission power control.

In the present embodiment, the Discovery instruction signal may include information for designating a timing at which the Discovery signal is transmitted. In this way, the eNB 200 is able to control the timing at which the Discovery signal is transmitted.

In the present embodiment, when the Discovery instruction signal was received, the UE 100-1 stops the transmission of data to the eNB 200. In this way, during preparation for performing the D2D communication, since the UE 100-1 does not need to transmit data to the eNB 200, it is possible to reduce a load of the UE 100-1.

Second Embodiment

Hereinafter, a second embodiment will be described while focusing on the differences from the first embodiment.

The second embodiment is different from the first embodiment in terms of an operation of acquiring location information and an operation for determining whether D2D communication is possible. Accordingly, the operation of acquiring the location information and the operation for determining whether the D2D communication is possible according to the second embodiment will be described with reference to FIG. 16.

(Operation of Acquiring Location Information and Operation for Determining Whether D2D Communication is Possible)

Figure 16:
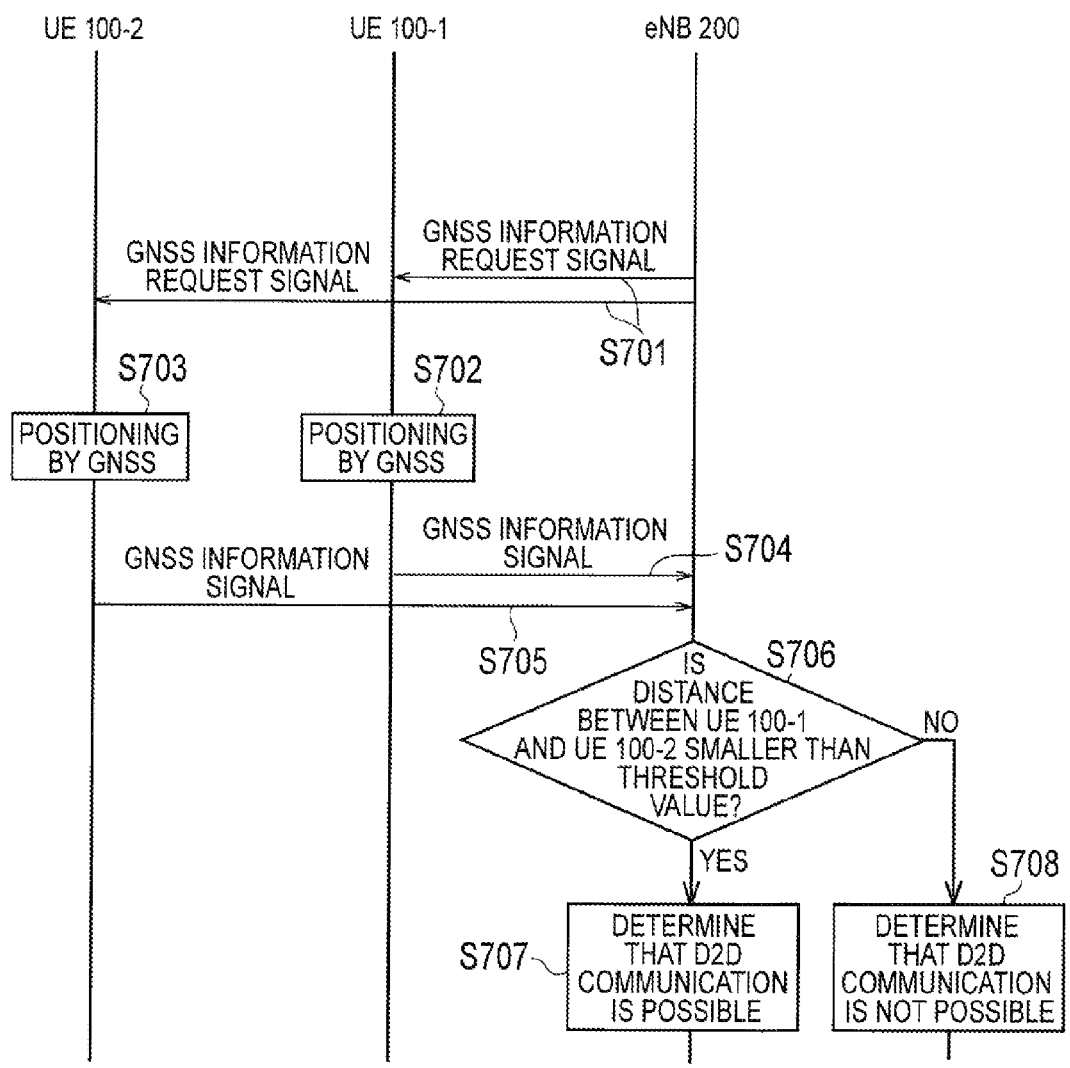
FIG. 16 is a sequence diagram of an operation of acquiring location information and an operation for determining whether D2D communication is possible according to a second embodiment.

FIG. 16 is a sequence diagram of the operation of acquiring the location information and the operation for determining whether the D2D communication is possible according to the second embodiment.

As illustrated in FIG. 16, in step 701, the eNB 200 transmits, to the UE 100-1, a GNSS information request signal including information for requesting GNSS information of the UE 100-1. In the same manner, the eNB 200 transmits a GNSS information request signal of the UE 100-2 to the UE 100-2.

In step 702, the UE 100-1 evaluates the location of the UE 100-1 by a global navigation satellite system (GNSS).

In step 703, the UE 100-2 evaluates the location of the UE 100-1 similarly to step 702.

In step 704, the UE 100-1 transmits, to the eNB 200, the GNSS information indicating the location of the UE 100-1, which information was evaluated by the GNSS. In this way, the eNB 200 acquires the location information of the UE 100-1.

In step 705, similarly to step 704, the UE 100-2 transmits the GNSS information of the UE 100-2 to the eNB 200, and the eNB 200 acquires the location information of the UE 100-2.

In step 706, on the basis of the acquired location information, the eNB 200 determines whether the distance between the UE 100-1 and the UE 100-2 is smaller than a predetermined threshold value. Step 706 corresponds to step 204 of FIG. 11.

Step 707 corresponds to step 205 of FIG. 11 and step 708 corresponds to step 206 of FIG. 11.

Summary of Second Embodiment

In the present embodiment, the location information includes information indicating the location of each of the UE 100-1 and the UE 100-2, which information is evaluated by GNSS. In this way, the location of each of the UE 100-1 and the UE 100-2 is accurately obtained, so that it is possible to improve the accuracy of determination regarding whether the D2D communication by the UE 100-1 and the UE 100-2 is possible.

Third Embodiment

Hereinafter, a third embodiment will be described while focusing on differences from the first embodiment.

The first embodiment considers the case in which the UE 100-1 and the UE 100-2 establish a connection with the same eNB 200. In the third embodiment, each of the UE 100-1 and the UE 100-2 may establish a connection with base stations (eNB 200 and eNB 202) different from each other.

(Operation of Mobile Communication System According to Third Embodiment)

The operation of the mobile communication system according to the third embodiment will be described in sequence of (1) Entire operation and (2) Operation of acquiring location information and operation for determining whether D2D communication is possible.

(1) Entire Operation

Figure 17:
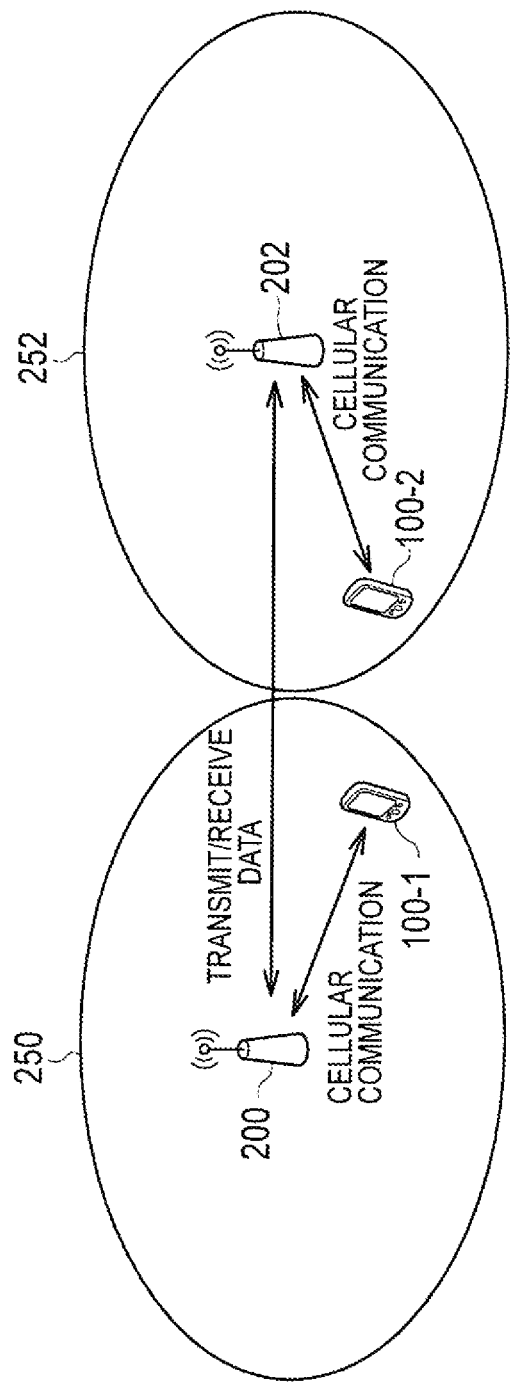
FIG. 17 is a diagram illustrating an example of a positional relation between UE 100-1/UE 100-2 and eNB 200/eNB 202 according to a third embodiment.

With reference to FIG. 17 and FIG. 18, the entire operation will be described.

FIG. 17 is a diagram illustrating a positional relation between the UE 100-1/the UE 100-2 and the eNB 200/the eNB 202 according to the third embodiment.

As illustrated in FIG. 17, the UE 100-1 exists in the cell 250 managed by the eNB 200. Furthermore, the UE 100-1 establishes a connection with the eNB 200. Meanwhile, the UE 100-2 exists in a cell 252 managed by the eNB 202. Furthermore, the UE 100-2 establishes a connection with the eNB 202. The eNB 200 and the eNB 202 are adjacent to each other. Furthermore, the cell 250 and the cell 252 are neighboring cells adjacent to each other. The UE 100-1 and the UE 100-2 perform cellular communication via the eNB 200 and the eNB 202.

FIG. 18 is an example of an entire operation sequence diagram according to the third embodiment.

As illustrated in FIG. 18, in step 801, the UE 100-1 and the UE 100-2 perform cellular communication via the eNB 200 and the eNB 202.

In step 802, the eNB 200 acquires the location information of each of the UE 100-1 and the UE 100-2. Moreover, the eNB 200 determines whether D2D communication by the UE 100-1 and the UE 100-2 is possible. In the present embodiment, the location information includes information indicating a cell on which each of the UE 100-1 and the UE 100-2 camps, as described later.

A result obtained by determining whether the D2D communication by the UE 100-1 and the UE 100-2 is possible is recorded in the communication management table.

Step 803 to step 807 correspond to step 103 to step 107 of FIG. 10, respectively.

In step 808, the eNB 200, which received, from the UE 100-1, a report indicating the reception of a Discovery response signal from the UE 100-2, reports the content of the report to the eNB 202.

Step 809 to step 813 correspond to step 108 to step 112 of FIG. 10, respectively.

In step 814, the eNB 200, which received, from the UE 100-1, a report indicating the establishment of a D2D link between the UE 100-1 and the UE 100-2, reports the content of the report to the eNB 202.

In step 815, the eNB 200 that received the report records the fact that the UE 100-1 and the UE 100-2 are performing D2D communication in the communication management table. Furthermore, the eNB 200 ends the cellular communication with the UE 100-1 and the UE 100-2.

In step 816, similarly to step 815, the eNB 202 which received the report records the fact that the UE 100-1 and the UE 100-2 are performing D2D communication in the communication management table, and ends the cellular communication with the UE 100-1 and the UE 100-2.

(2) Operation of Acquiring Location Information and Operation for Determining Whether D2D Communication is Possible With reference to FIG. 19, the operation of acquiring the location information and the operation for determining whether the D2D communication is possible will be described.

FIG. 19 is a flowchart of the operation of acquiring the location information and the operation for determining whether the D2D communication is possible according to the third embodiment. The present operation corresponds to step 802 of FIG. 18.

As illustrated in FIG. 19, in step 901, the processor 240 of the eNB 200 determines whether camping cell information indicating a cell on which the UE 100-2 camps has been recorded in the communication management table. Specifically, firstly, the processor 240 acquires the identification information of the UE 100-2 from the MME similarly to step 201 of FIG. 13. Next, on the basis of the acquired identification information of the UE 100-2, the processor 240 determines whether the camping cell information has been recorded in the communication management table.

The eNB 200 and the eNB 202 may periodically exchange the communication management table via an X2 interface or an S1 interface. When the eNB 200 and the eNB 202 exchange the communication management table, the camping cell information is recorded in the communication management table of the eNB 200.

When the camping cell information of the UE 100-2 has been recorded in the communication management table, the processor 240 performs a process of step 902. Meanwhile, when the camping cell information of the UE 100-2 has not been recorded in the communication management table, the processor 240 performs a process of step 903.

In addition, in relation to the camping cell information of the UE 100-1, since the eNB 200 establishes a connection with the UE 100-1, the camping cell information of the UE 100-1 is recorded in the communication management table of the eNB 200.

In step 902, the processor 240 determines whether the UE 100-1 and the UE 100-2 camp on the same cell. Specifically, the processor 240 determines whether a cell on which the UE 100-1 camps coincides with a cell on which the UE 100-2 camps.

When the UE 100-1 and the UE 100-2 camp on the same cell, the processor 240 performs a process of step 906. Meanwhile, when the UE 100-1 and the UE 100-2 do not camp on the same cell, the processor 240 performs a process of step 905.

In step 903, the processor 240 controls the X2 interface or the S1 interface to request the eNB 202, which is a neighboring base station, to transmit the camping cell information of the UE 100-2.

In addition, the request includes identification information for identifying the UE 100-2 that is a communication partner of the UE 100-1.

In step 904, the processor 240 acquires the camping cell information of the UE 100-2. The processor 240 may acquire the camping cell information of the UE 100-2 from the eNB 202, or may acquire the communication management table included in the eNB 202, which recorded the camping cell information of the UE 100-2. Furthermore, when acquiring the communication management table of the eNB 202, the processor 240 may transmit the communication management table of the eNB 200 to the eNB 202. That is, the eNB 200 and the eNB 202 may exchange the communication management table via the X2 interface or the backhaul.

In step 905, the processor 240 determines whether the UE 100-1 and the UE 100-2 camp on neighboring cells. Specifically, the processor 240 determines whether the UE 100-2 camps on a neighboring cell adjacent to the cell on which the UE 100-1 camps.

When it is determined that the UE 100-2 camps on the neighboring cell, the processor 240 performs the process of step 906. Meanwhile, when it is determined that the UE 100-2 does not camp on the neighboring cell, the processor 240 performs a process of step 907.

In step 906, when it is determined that the UE 100-1 and the UE 100-2 camp on the same cell or when it is determined that the UE 100-2 camps on the neighboring cell, the processor 240 determines that the UE 100-1 and the UE 100-2 are able to perform D2D communication.

Meanwhile, in step 907, when it is determined that the UE 100-2 does not camp on the neighboring cell, the processor 240 determines that the UE 100-1 and the UE 100-2 are not able to perform D2D communication.

Summary of Third Embodiment

In the present embodiment, the location information includes information indicating a cell on which each of the UE 100-1 and the UE 100-2 camps, and the processor 240 determines that the D2D communication by the UE 100-1 and the UE 100-2 is possible when the UE 100-2 camps on a cell on which the UE 100-1 camps, or a neighboring cell adjacent to the cell on which the UE 100-1 camps. In this way, even when the location of each of the UE 100-1 and the UE 100-2 is not designated, the eNB 200 is able to determine whether the D2D communication by the UE 100-1 and the UE 100-2 is possible.

The eNB 200 according to the present embodiment is able to acquire the camping cell information of the UE 100-2 from the eNB 202. In this way, the eNB 200 is able to acquire the location information (the camping cell information) of the UE 100-2 that establishes no connection with the eNB 200, resulting in the expansion of an area where it can be determined that the D2D communication is possible.

Other Embodiments

Thus, the present invention has been described with the embodiments. However, it should not be understood that those descriptions and drawings constituting a part of this disclosure limit the present invention. From this disclosure, a variety of alternate embodiments, examples, and applicable techniques will become apparent to one skilled in the art.

For example, in the aforementioned embodiments, the determination unit is provided to the eNB 200 (that is, the processor 240 of the eNB 200 performs determination). However, the present invention is not limited thereto. For example, the determination unit may be provided to the MME that is an upper apparatus of the eNB 200. In the case in which the determination unit is provided to the MME, when it is determined that the D2D communication by the UE 100-1 and the UE 100-2 is possible, the MME requests the eNB 200 to transmit the Discovery instruction signal. The eNB 200 which received the request transmits the Discovery instruction signal to the UE 100-1.

In the case in which the determination unit is provided to the MME, the MME may have the communication management table. When the MME has the communication management table, the eNB 200, which received the report of the establishment of a D2D link from the UE 100-1, reports the establishment of the D2D link between the UE 100-1 and the UE 100-2 to the MME. The MME records, in the communication management table, that the UE 100-1 and the UE 100-2 is performing D2D communication.

Furthermore, the aforementioned embodiments consider the case in which the UE 100-1 and the UE 100-2 perform cellular communication. However, it may be possible to consider the case in which three or more UEs 100 (a UE group) perform cellular communication. In this case, the eNB 200 may select a UE group capable of performing D2D communication from the communication management table.

Furthermore, in the first embodiment, the communication management table may have an item "D2D communication possibility". The "D2D communication possibility" indicates the possibility whether D2D communication is possible. For example, as the distance between UE establishing a connection with the eNB 200 and UE serving as a communication partner is shorter, it is more highly possible to perform the D2D communication. As the distance is longer, it is less possible to perform the D2D communication. In response to the D2D communication possibility, ranking may be made. The processor 240 may select a UE pair with high ranking.

Furthermore, in the third embodiment, when the UE 100-2 camps on a cell on which the UE 100-1 camps, or a neighboring cell adjacent to the cell on which the UE 100-2 camps, it is determined that the D2D communication by the UE 100-1 and the UE 100-2 is possible. However, only when the UE 100-2 camps on the cell on which the UE 100-1 camps, it may be determined that the D2D communication by the UE 100-1 and the UE 100-2 is possible.

Furthermore, in the third embodiment, the eNB 200 manages the cell 250 and the eNB 202 manages the cell 252. However, each of the eNB 200 and the eNB 202 may manage a plurality of cells.

Furthermore, it may be possible to appropriately embody combinations of the configurations of the first embodiment to the third embodiment. For example, the eNB 200 may determine whether the D2D communication is possible, in consideration of a plurality of types of location information (for example, information indicating a camping cell, direction information, and distance information). In this way, it is possible to improve the accuracy of determination regarding whether the D2D communication is possible.

In the aforementioned embodiments, one example of applying the present invention to the LTE system is described; however, the present invention is not limited to the LTE system, and the present invention may be applied to a communication system other than the LTE system.

In addition, the entire content of U.S. Provisional Application No. 61/723,415 (filed on Nov. 7, 2012) is incorporated in the present specification by reference.

INDUSTRIAL APPLICABILITY

As described above, the mobile communication system, the base station, the processor and the user terminal according to the present invention are able to appropriately control D2D communication, and thus they are useful for a mobile communication field.

The invention claimed is:

1. A mobile communication system, comprising:
a base station,
a first user terminal configured to establish a connection with the base station, and
a second user terminal configured to perform communication with the first user terminal via the base station,
a neighboring base station adjacent to the base station, and
a determination unit configured to determine whether device to device (D2D) communication by the first user terminal and the second user terminal is possible, and the mobile communication system supporting the D2D communication that is direct device to device communication, wherein
when it is determined that the D2D communication by the first user terminal and the second user terminal is possible, the base station transmits, to only the first user terminal, an instruction for having a signal for discovery transmitted, the signal for discovery being used in discovery of a communication partner terminal in the D2D communication,
when it is estimated that the first user terminal and the second user terminal are close to each other on the basis of location information of each of the first user terminal and the second user terminal, the determination unit determines that the D2D communication by the first user terminal and the second user terminal is possible, and
when the second user terminal establishes a connection with the neighboring base station, the base station acquires the location information of the second user terminal from the neighboring base station.

2. The mobile communication system according to claim 1, wherein the determination unit is provided to the base station.

3. The mobile communication system according to claim 1, wherein the determination unit is provided to an upper apparatus of the base station.

4. The mobile communication system according to claim 1, wherein
the location information includes:
direction information indicating a direction of each of the first user terminal and the second user terminal on the basis of the base station, and
distance information indicating a distance between each of the first user terminal and the second user terminal and the base station.

5. The mobile communication system according to claim 4, wherein the base station performs communication with each of the first user terminal and the second user terminal through multi-antenna transmission, and
the direction information is decided in response to a directional pattern in the multi-antenna transmission.

6. The mobile communication system according to claim 4, wherein the distance information is decided in response to a propagation delay time of each of the first user terminal and the second user terminal, which time is evaluated from a timing at which the base station receives an uplink signal transmitted from each of the first user terminal and the second user terminal.

7. The mobile communication system according to claim 4, wherein the distance information is decided in response to propagation loss of each of the first user terminal and the second user terminal, which loss is evaluated from transmission power of an uplink signal transmitted from each of the first user terminal and the second user terminal, and received power when the base station receives the uplink signal.

8. The mobile communication system according to claim 1, wherein the location information includes information indicating the location of each of the first user terminal and the second user terminal, which information is evaluated by a global navigation satellite system.

9. The mobile communication system according to claim 1, wherein
the location information includes information indicating a cell on which each of the first user terminal and the second user terminal camps, and
the determination unit determines that the D2D communication by the first user terminal and the second user terminal is possible when the second user terminal camps on a cell on which the first user terminal camps, or a neighboring cell adjacent to the cell on which the first user terminal camps.

10. The mobile communication system according to claim 1, further comprising: the instruction includes information for designating a timing at which the signal for discovery is transmitted.

11. The mobile communication system according to claim 1, wherein when the instruction is received, the first user terminal stops transmission of data to the base station.

12. A base station in a mobile communication system, which supports device to device (D2D) communication that is direct device to device communication, comprising:
a control unit configured to
determine whether the D2D communication by a first user terminal and a second user terminal is possible, the first user terminal establishing a connection with the base station, the second user terminal performing communication with the first user terminal via the base station, and
transmit an instruction to only the first user terminal when it is determined that the D2D communication by the first user terminal and the second user terminal is possible, wherein
the instruction is for having a signal for discovery being used in discovery of a communication partner terminal in the D2D communication, and the control unit is configured to
determine that the D2D communication by the first user terminal and the second user terminal is possible when it is estimated that the first user terminal and the second user terminal are close to each other on the basis of location information of each of the first user terminal and the second user terminal, and
acquire the location information of the second user terminal from a neighboring base station when the second user terminal establishes a connection with the neighboring base station.

13. A processor, which is provided in a base station in a mobile communication system that supports device to device (D2D) communication that is direct device to device communication, executing:
a process of determining whether the D2D communication by a first user terminal and a second user terminal is possible, the first user terminal establishing a connection with the base station, the second user terminal performing communication with the first user terminal via the base station; and
a process of transmitting an instruction to only the first user terminal when it is determined that the D2D communication by the first user terminal and the second user terminal is possible, wherein
the instruction is for having a signal for discovery being used in discovery of a communication partner terminal in the D2D communication, and
the processor executes:
the process of determining that the D2D communication by the first user terminal and the second user terminal is possible when it is estimated that the first user terminal and the second user terminal are close to each other on the basis of location information of each of the first user terminal and the second user terminal, and
a process of acquiring the location information of the second user terminal from a neighboring base station when the second user terminal establishes a connection with the neighboring base station.

* * * * *